US012743728B2

(12) United States Patent
Haber

(10) Patent No.: US 12,743,728 B2
(45) Date of Patent: Sep. 22, 2026

(54) INSURANCE RESOLUTION PLATFORM

(71) Applicant: Umpire Assistant Company, Conifer, CO (US)

(72) Inventor: Laura Haber, Conifer, CO (US)

(73) Assignee: Umpire Assistant Company, Conifer, CO (US)

( * ) Notice: Subject to any disclaimer, the term of this patent is extended or adjusted under 35 U.S.C. 154(b) by 0 days.

(21) Appl. No.: 19/214,913

(22) Filed: May 21, 2025

(65) Prior Publication Data

US 2026/0195819 A1 Jul. 9, 2026

Related U.S. Application Data

(63) Continuation of application No. 19/012,745, filed on Jan. 7, 2025.

(51) Int. Cl.
*G06Q 40/08* (2012.01)
*G06F 40/106* (2020.01)
(Continued)

(52) U.S. Cl.
CPC .......... *G06Q 40/08* (2013.01); *G06F 40/106* (2020.01); *G06F 40/194* (2020.01); (Continued)

(58) Field of Classification Search
USPC ........................................................ 705/37
See application file for complete search history.

(56) References Cited

U.S. PATENT DOCUMENTS 7,403,942 B1 * 7/2008 Bayliss ................ G06F 16/215 707/999.005
7,676,522 B2 * 3/2010 Klein ................... H04L 43/022 707/811
(Continued)

FOREIGN PATENT DOCUMENTS

KR 101744020 B1 6/2017

OTHER PUBLICATIONS

R. Suresh and S. R. Harshni, "Data mining and text mining—A survey," 2017 International Conference on Computation of Power, Energy Information and Communcation (ICCPEIC), Melmaruvathur, India, 2017, pp. 412-420 (Data Mining). (Year: 2017).*
(Continued)

*Primary Examiner* — Chikaodinaka Ojiaku
(74) *Attorney, Agent, or Firm* — NOD Law PC

(57) ABSTRACT

A method, system, and computer-readable medium are disclosed for processing and comparing documents in varying formats, incorporating advanced data extraction, normalization, and comparison techniques. The method includes receiving documents containing structured and unstructured data, processing them with optical character recognition and layout analysis to identify structural elements, and extracting key data fields using natural language processing, including named entity recognition and contextual analysis. Extracted data is normalized through schema mapping and synonym resolution, ensuring consistency in terminology and structure. The system employs fuzzy matching algorithms to identify discrepancies between documents and provides an interactive user interface with graphical visualizations, such as heatmaps and comparison charts, for reviewing and resolving differences. Machine learning techniques refine the system over time by integrating user
(Continued)

feedback to improve data extraction, synonym resolution, and comparison accuracy.

20 Claims, 17 Drawing Sheets

(51) Int. Cl.
*G06F 40/194* (2020.01)
*G06V 10/70* (2022.01)
*G06V 10/74* (2022.01)
*G06V 10/762* (2022.01)
*G06V 30/19* (2022.01)
*G06V 30/418* (2022.01)
*G06V 30/42* (2022.01)

(52) U.S. Cl.
CPC .......... *G06V 10/761* (2022.01); *G06V 10/762* (2022.01); *G06V 10/768* (2022.01); *G06V 30/19093* (2022.01); *G06V 30/19107* (2022.01); *G06V 30/19147* (2022.01); *G06V 30/418* (2022.01); *G06V 30/42* (2022.01)

(56) References Cited

U.S. PATENT DOCUMENTS 7,779,051 B2* 8/2010 Friedlander ............. G06F 16/22 707/804
9,075,668 B1* 7/2015 Hushon .................. G16H 40/20
9,268,763 B1* 2/2016 Esho ..................... G06F 40/143
9,600,839 B2* 3/2017 Calman ............. G06Q 30/0629
9,619,792 B1* 4/2017 Aaron ................ G06Q 30/0226
9,798,799 B2* 10/2017 Wolverton .......... G06F 16/3329
9,836,488 B2* 12/2017 Marrelli ................ G06F 16/215
9,911,110 B2* 3/2018 Scott ...................... G07F 7/127
10,062,109 B1* 8/2018 Poursartip .............. G06Q 40/03
10,467,601 B1* 11/2019 Bricca ................. G06F 16/9566
10,496,977 B2* 12/2019 Ruder .................. G06Q 20/322
10,528,262 B1* 1/2020 Shmuylovich .......... G06F 3/067
10,628,811 B2* 4/2020 Tsou ...................... G06Q 20/12
10,853,855 B2* 12/2020 John .................... G06Q 20/386
11,210,730 B1* 12/2021 Woodyard ........... G07G 1/0063
11,379,537 B2* 7/2022 Chatelain .............. G06F 16/164
11,442,907 B2* 9/2022 Portisch .............. G06F 16/2282
11,574,280 B1* 2/2023 Wier ...................... G06Q 40/12
11,574,492 B2* 2/2023 Skoryukina ............ G06V 10/40
11,593,631 B2* 2/2023 Dalli .................... G06N 3/0495
11,663,254 B2* 5/2023 Conrad ................. G06F 16/334 707/728
11,694,168 B2* 7/2023 Ledford ............... G06Q 20/023 705/44
11,694,203 B1* 7/2023 Morris ............. G06Q 20/40145 705/18
11,699,023 B2* 7/2023 Le Chevalier .......... G06F 3/011 715/204
11,704,302 B2* 7/2023 Lee ........................ G06F 16/21 707/609
11,734,579 B2* 8/2023 Neelamana ........... G06F 16/248 706/50
11,763,087 B2* 9/2023 Borchmann .......... G06F 40/295 345/629
11,763,585 B2* 9/2023 Mukherjee ............ G06F 18/214 382/157
11,763,919 B1* 9/2023 Jain ........................ G16H 10/20 715/221
11,817,012 B2* 11/2023 Tsu ....................... G06F 40/169
11,830,267 B2* 11/2023 Ghosh .................. G06V 30/418
11,909,698 B2* 2/2024 Gollareddy ......... G06F 16/3329
2005/0171932 A1 8/2005 Nandhra
2005/0222928 A1 10/2005 Steier et al.
2005/0251733 A1* 11/2005 Elkady .................. G06F 40/174 715/209
2006/0277141 A1* 12/2006 Palmer ................... G06Q 40/02 705/38
2008/0195430 A1* 8/2008 Rustagi ............ G06Q 10/06395 705/7.41
2008/0208830 A1 8/2008 Lauckhart et al.
2008/0235288 A1* 9/2008 Ben Harush .......... G06F 16/217
2009/0171889 A1* 7/2009 Friedlander ............. G06F 16/22
2010/0228581 A1* 9/2010 DeFrancesco ......... G06Q 10/10 707/E17.017
2010/0312737 A1* 12/2010 Coldicott ................ G06F 16/21 706/45
2011/0173122 A1* 7/2011 Singhal .................. G06Q 20/42 705/44
2011/0282969 A1 11/2011 Iyer et al.
2011/0289086 A1* 11/2011 Jordan .............. G06F 16/24557 707/E17.046
2013/0191723 A1 7/2013 Pappas et al.
2013/0198123 A1* 8/2013 Stadermann ......... G06V 30/414 706/46
2014/0019340 A1* 1/2014 Ruder ................ G06Q 20/4016 705/39
2014/0067433 A1 3/2014 Hargrove
2014/0258118 A1* 9/2014 Scott .................... G06Q 20/204 705/44
2014/0348396 A1* 11/2014 Laaser ................... G06V 30/40 382/113
2015/0073864 A1* 3/2015 Labrie ................ G06Q 30/0201 705/7.29
2015/0186871 A1* 7/2015 Laracey ............... G06Q 20/322 705/41
2015/0317747 A1* 11/2015 Ghosh .................... G06Q 40/12 705/30
2016/0063500 A1* 3/2016 Sherlock ........... G06Q 20/3825 705/44
2016/0078443 A1* 3/2016 Tomasofsky ....... G06Q 20/3674 705/14.3
2016/0147798 A1* 5/2016 Marrelli ................ G06F 16/215 707/692
2016/0148258 A1* 5/2016 Chavarria .......... G06Q 30/0261 705/14.53
2016/0162998 A1* 6/2016 Johansen ............ G06Q 20/202 705/21
2016/0203490 A1* 7/2016 Gupta .................. G06Q 20/308 705/44
2016/0292262 A1 10/2016 Matsumoto
2018/0005204 A1* 1/2018 Khattar ................ G06Q 20/102
2018/0060302 A1 3/2018 Liang et al.
2018/0349817 A1* 12/2018 Goel ................... G06F 18/2113
2019/0057377 A1* 2/2019 Zigoris .............. G06Q 20/4016
2019/0087815 A1* 3/2019 Goldschmidt ..... G06Q 20/3674
2019/0087845 A1* 3/2019 Kohli ................ G06Q 20/0855
2019/0228455 A1* 7/2019 Kumar ............... G06Q 30/0264
2019/0279171 A1* 9/2019 Stewart .................. G06Q 40/00
2019/0340692 A1* 11/2019 Labrie ............ G06Q 10/063112
2020/0134021 A1* 4/2020 Moore .................. G06F 3/0484
2020/0294089 A1* 9/2020 Wikman ............ G06Q 30/0255
2020/0364270 A1 11/2020 Harpale
2020/0401938 A1 12/2020 Etkin et al.
2021/0004812 A1* 1/2021 Mossoba ............ G06Q 20/0855
2021/0141801 A1* 5/2021 Teague .................. G06F 16/258
2021/0174366 A1* 6/2021 Zeng .................. G06Q 20/4016
2021/0264025 A1 8/2021 Givental et al.
2021/0318995 A1* 10/2021 Portisch ................ G06F 16/211
2022/0094648 A1* 3/2022 Le ........................ G06N 3/0464
2022/0107964 A1* 4/2022 Chandrasekar ....... G06F 16/355
2022/0172179 A1* 6/2022 Bricca .................. G06Q 20/401
2022/0245691 A1* 8/2022 Venkatasubramaniam .................. G06N 20/00
2022/0310246 A1* 9/2022 Larsen ............... A61B 5/02055
2023/0029990 A1 2/2023 Ogawa
2023/0082381 A1* 3/2023 Gnanasambandam .. G06N 5/02 705/4
2023/0164168 A1 5/2023 Lee et al.
2023/0168656 A1* 6/2023 Scheepens ........... G05B 19/406 700/111
2023/0173395 A1* 6/2023 Cella ....................... G06F 21/10 463/25
2023/0206329 A1* 6/2023 Cella ....................... G06F 21/44

(56) References Cited

U.S. PATENT DOCUMENTS

| | | | | |
|---|---|---|---|---|
| 2023/0214601 | A1* | 7/2023 | Moore | G06F 40/35 704/9 |
| 2023/0214925 | A1* | 7/2023 | Cella | G06Q 30/06 705/37 |
| 2023/0230100 | A1* | 7/2023 | Kodimer | G06F 11/0733 |
| 2024/0031375 | A1* | 1/2024 | Morgan | H04W 12/61 |
| 2024/0062004 | A1 | 2/2024 | Shachor et al. | |
| 2024/0169193 | A1 | 5/2024 | Bews | |
| 2024/0370517 | A1 | 11/2024 | DeVos et al. | |
| 2025/0209461 | A1* | 6/2025 | Medure | G06Q 20/4014 |

OTHER PUBLICATIONS

Asim, Muhammad Nabeel and Wasim, Muhammad and Ghani Khan, Muhammad Usman and Mahmood, Nasir and Mahmood, Waqar}, The Use of Ontology in Retrieval: A Study on Textual, Multilingual, and Multimedia Retrieval. Jan. 2019. (Year: 2019) (Ontology).*

Non-Final Office Action issued for U.S. Appl. No. 19/012,745, Feb. 17, 2026, 25 pages.

International Search Report and the Written Opinion of the International Searching Authority for PCT application No. PCT/US2026/010341, mailing date Mar. 30, 2026, 6 pages.

* cited by examiner

Figure 7:
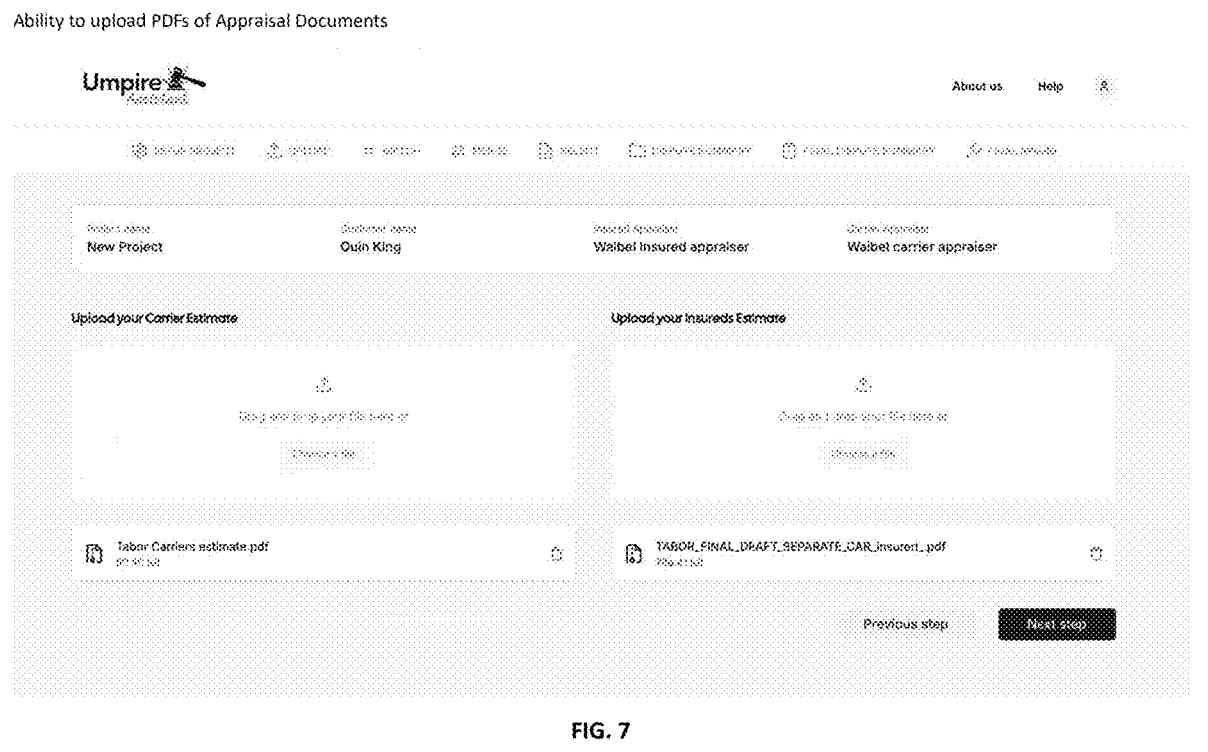

Ability to upload PDFs of Appraisal Documents

Umpire

About us
Help

New Project
Waibel insured appraiser
Waibel carrier appraiser

Upload your Carrier Estimate
Upload your Insureds Estimate

Tabor Carriers estimate.pdf
TABOR_FINAL_DRAFT_SEPARATE_CAR_insured_.pdf

Previous step
Next step

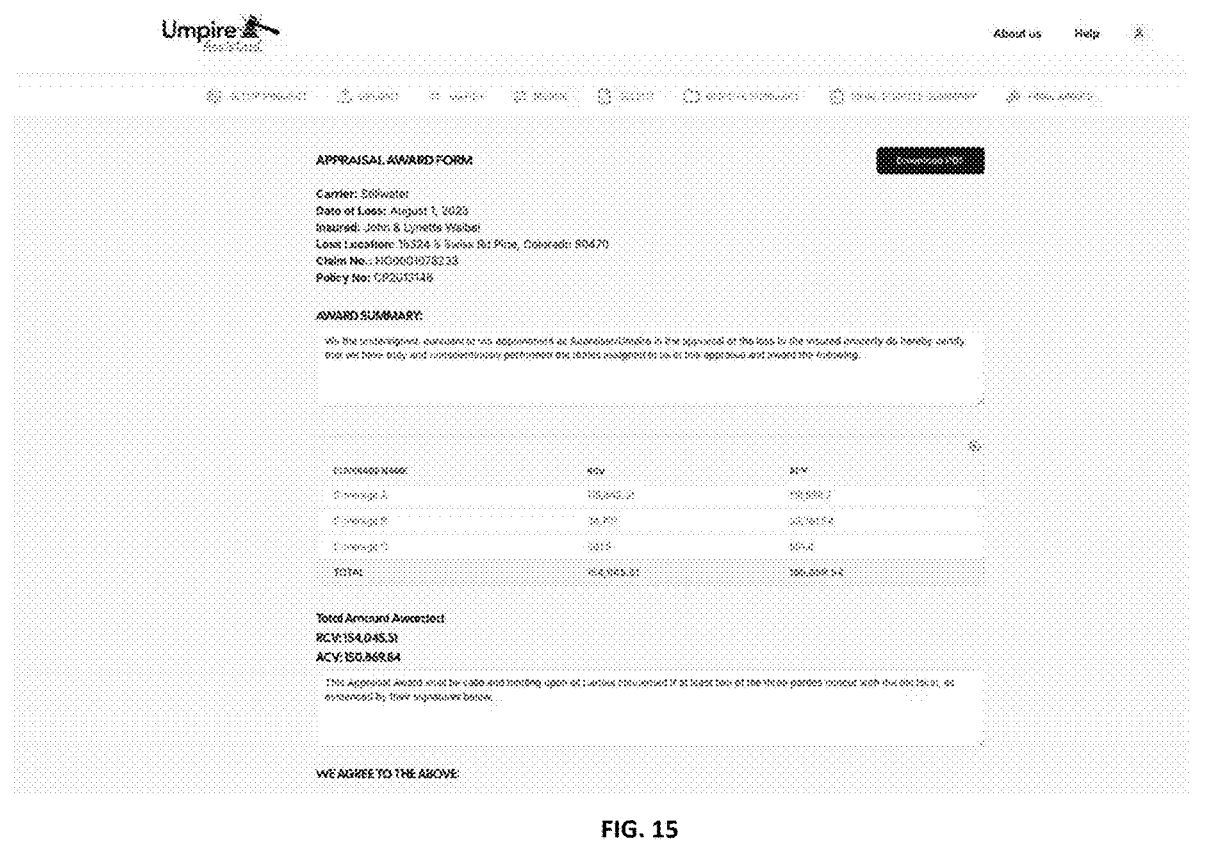

Umpire

About us Help

APPRAISAL AWARD FORM

Carrier: Stillwater
Date of Loss: August 1, 2023
Insured: John & Lynette Weibel
Loss Location: 16524 S Swiss Rd Pine, Colorado 80470
Claim No.: HOXX01078233
Policy No: CP2055146

AWARD SUMMARY:

[illegible]

| | | |
|---|---|---|
| Coverage A | [illegible] | [illegible] |
| Coverage B | [illegible] | [illegible] |
| Coverage C | [illegible] | [illegible] |
| TOTAL | [illegible] | [illegible] |

Total Amount Awarded
RCV: 154,045.51
ACV: 150,869.64

[illegible]

WE AGREE TO THE ABOVE:

FIG. 15

INSURANCE RESOLUTION PLATFORM

CROSS REFERENCE TO RELATED APPLICATIONS

This application is a Continuation of U.S. patent application Ser. No. 19/012,745, filed Jan. 7, 2025, and entitled "INSURANCE RESOLUTION PLATFORM," pending, the entire disclosures of which are hereby incorporated by reference for all proper purposes.

FIELD OF THE DISCLOSURE

The present disclosure relates generally to systems and methods for adjudicating insurance disputes. In particular, but not by way of limitation, the present disclosure relates to systems, methods and apparatuses for comparing and adjudicating insurance appraisals.

DESCRIPTION OF RELATED ART

Disagreements between the policyholder and the insurer. The process typically begins when the policyholder examines the insurer's decision and their policy terms to understand why the claim was denied or disputed. If unclear, the policyholder can request a more detailed explanation from the insurer and submit additional evidence, such as photos, repair estimates, or expert assessments, to support their claim.

Next, the policyholder may pursue an internal appeals process offered by the policy called the appraisal provision. This involves submitting a formal appeal for a higher-level review, often handled by a different claims adjuster or a designated appeals team. If the internal appeal does not resolve the issue, the policyholder might hire third party to evaluate their claimed amount of loss. These professionals provide an unbiased assessment of the damage and an alternative estimate that can be presented to the insurer as a basis for negotiation.

If both parties remain at an impasse, they can invoke the umpire or arbitration clause. In this clause, each party selects an appraiser, and the two appraisers jointly choose an impartial umpire. The umpire evaluates the appraisals from both the insurer and the policyholder and then will rule on the differences for settlement.

When either the insurer or the policyholder invokes the appraisal clause, both parties are usually required to appoint their independent appraisers within a specific time frame, often twenty days. Each appraiser will represent their respective party to assess the loss and attempt to agree on a value.

Once the appraisers are selected, they have a set amount of time (sometimes explicitly 20 days, depending on the policy or state regulations) to begin the process of examining the damage, gathering necessary documentation, and working toward an agreement. If the two appraisers cannot agree on the value within the stipulated time, the policy may require them to select a neutral umpire to resolve the disagreement, and sometimes the policy requires an umpire be agreed upon within a certain amount of time (i.e., 15 days of the appraisers being appointed). The appraisers may then set the amount of the loss. If the appraisers submit a written report of agreement, the amount agreed upon shall be the amount of the loss. If the appraisers fail to agree within a reasonable time, their differences are submitted to the umpire. Written agreement signed by any two of these three (the two appraisers and the umpire) shall set the amount of the loss. Because there are often set timelines for such resolutions, there is a need to facilitate a prompt resolution of insurance appraisals.

Traditional processes often require appraisers to manually review appraisal documents, which are typically unstandardized, leading to prolonged timelines and heightened susceptibility to human error. One of the primary challenges in preexisting technologies is the lack of a standardized format for insurance appraisals. Appraisal documents from different parties often vary in structure, terminology, varied estimating/construction software, and data presentation, making it difficult to conduct direct comparisons.

SUMMARY OF INVENTION

In accordance with various aspects of the invention a method of processing documents is provided, comprising, receiving, via a networked interface, the documents in a plurality of formats; sending the documents to a back-end computing system using one or more APIs, the back-end computing system running asynchronously to: process the documents using an input module configured to: apply optical character recognition to convert the documents into machine-readable text, and perform layout analysis to identify structural elements within the documents; extract, via a data extraction module, one or more predetermined data items from the documents using natural language processing techniques to form extracted predetermined data items; normalize, via a data normalization module, the extracted predetermined data items into a unified format by: applying schema mapping to align the extracted predetermined data items to a predefined structure; and resolving synonyms and terminological differences in the extracted predetermined data items using a synonym resolution algorithm to form normalized data; and compare the documents, via a comparison module, wherein comparing comprising matching the normalized data using fuzzy matching algorithms; determine a comparison result of one or more matched items and one or more mismatched items from the documents; and providing a user interface on the front-end via the one or more APIs for one or more users to interact with the comparison result, manually adjust the one or more matched and one or more mismatched items, and submit feedback.

In some embodiments, extracting, via the data extraction module, comprises employing named entity recognition to identify one or more predetermined data items and applying contextual analysis to interpret relationships between the one or more predetermined data items. In various embodiments, the input module uses one or more machine learning algorithms to improve a detection of one or more document structures over time. In some embodiments, the data normalization module applies one or more machine learning algorithms to dynamically update a synonym resolution database based on user feedback and new terminology. In various embodiments, the comparison module computes a cosine similarity between two or more embeddings of terms to measure a semantic similarity between the terms, and determines a pair of terms with a highest cosine similarity as a matched pair; and wherein the match pair is excluded from further matching. In some embodiments, the comparison module computes a cosine similarity between two or more embeddings of terms to measure a semantic similarity between the terms, and wherein a matched pair is determined if the cosine similarity exceeds 85%. In some embodiments, the comparison module uses reinforcement learning to optimize one or more fuzzy matching algorithms based on historical user inputs. In various embodiments, the method further comprises updating one or more natural language processing models with supervised learning techniques using user provided corrections to the one or more mismatched items. In some embodiments, extracting, via the data extraction module, comprises at least one of excluding text, visual diagrams, and handwritten notes. In various embodiments, the comparison module uses a custom functionality to match one or more documents descriptions from a first insurance appraisal document with one or more documents descriptions from a second insurance appraisal document, and wherein one or more unmatched document descriptions are repeatedly compared. In some embodiments, extracting one or more predetermined data items from the documents comprises extracting insurance appraisal specific data items.

In accordance with another exemplary embodiment, a system for automating a comparison of documents is provided comprising: a front-end comprising a user interface, the user interface configured to provide interactive tools for a user to review, filter, and modify the one or more documents; a back-end communicating with the front-end via one or more application program interfaces (APIs), the back-end comprising: an input module configured to receive one or more documents in varying formats and preprocess the one or more documents by converting the one or more documents into a machine-readable text using optical character recognition and analyzing the layouts in the one or more documents; a data extraction module employing natural language processing algorithms to extract one or more predetermined data items from the machine-readable text; a data normalization module configured to apply schema mapping to align the one or more predetermined data items a to a predefined structure and resolve terminological inconsistencies using a synonym database; a comparison module configured to align and analyze the one or more predetermined data items using one or more fuzzy matching algorithms to detect discrepancies between the one or more documents and pair corresponding items between the one or more documents; and a machine learning component configured to update one or more of the input module, data extraction module, data normalization module, and comparison module using user-provided feedback.

In various embodiments, the input module receives one or more appraisal documents and the one or more fuzzy matching algorithms are used to perform at least one of: pairing corresponding items, highlighting differences in appraised values, item conditions, and attributes, and flagging items present in a first appraisal but missing in a second appraisal. In some embodiments, the data normalization module further comprises a synonym resolution database employing one or more natural language processing algorithms to map synonymous terms within the one or more documents into a unified terminology schema. In some embodiments, the input module receives one or more appraisal documents the data normalization module is further configured to utilize a clustering algorithm to group similar appraisal items and automatically reconcile duplicated or inconsistent entries. In various embodiments, the user interface is configured to provide interactive visualizations of one or more comparison results, including dynamic charts and tables that highlight statistically significant differences between the one or more predetermined data items. In some embodiments, the comparison module is further configured to calculate and display confidence scores for each matched one or more predetermined data item, based on similarity metrics derived from the one or more fuzzy matching algorithms. In various embodiments, a first API communicates the documents from the front-end to the back-end, extracts data and provides a structured JSON response to a second API that stores the data in a database.

In accordance with an exemplary embodiment of the present invention, a non-transitory computer-readable medium storing instructions that, when executed by a processor, cause the processor to perform a method for comparing documents is provided, the method comprising: receiving one or more documents in one or more formats; processing the one or more documents using optical character recognition and layout analysis; extracting one or more data fields using natural language processing techniques; normalizing the one or more data fields into a predefined format using schema mapping and synonym resolution to form a normalized data; comparing the normalized data with one or more fuzzy matching algorithms to identify one or more discrepancies in the normalized data; generating a visual report of the one or more discrepancies and enabling a user interaction with the visual report; and adapting the method in response to the user interaction.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

FIG. 7 illustrates a screenshot of an exemplary embodiment of a document upload screen, in accordance with one aspect of the invention;

FIG. 9 illustrates a screenshot of an exemplary embodiment of a document comparison screen, in accordance with one aspect of the invention;

FIG. 15 illustrates a screenshot of an exemplary embodiment of an award screen, in accordance with one aspect of the invention;

DETAILED DESCRIPTION

Figure 1:
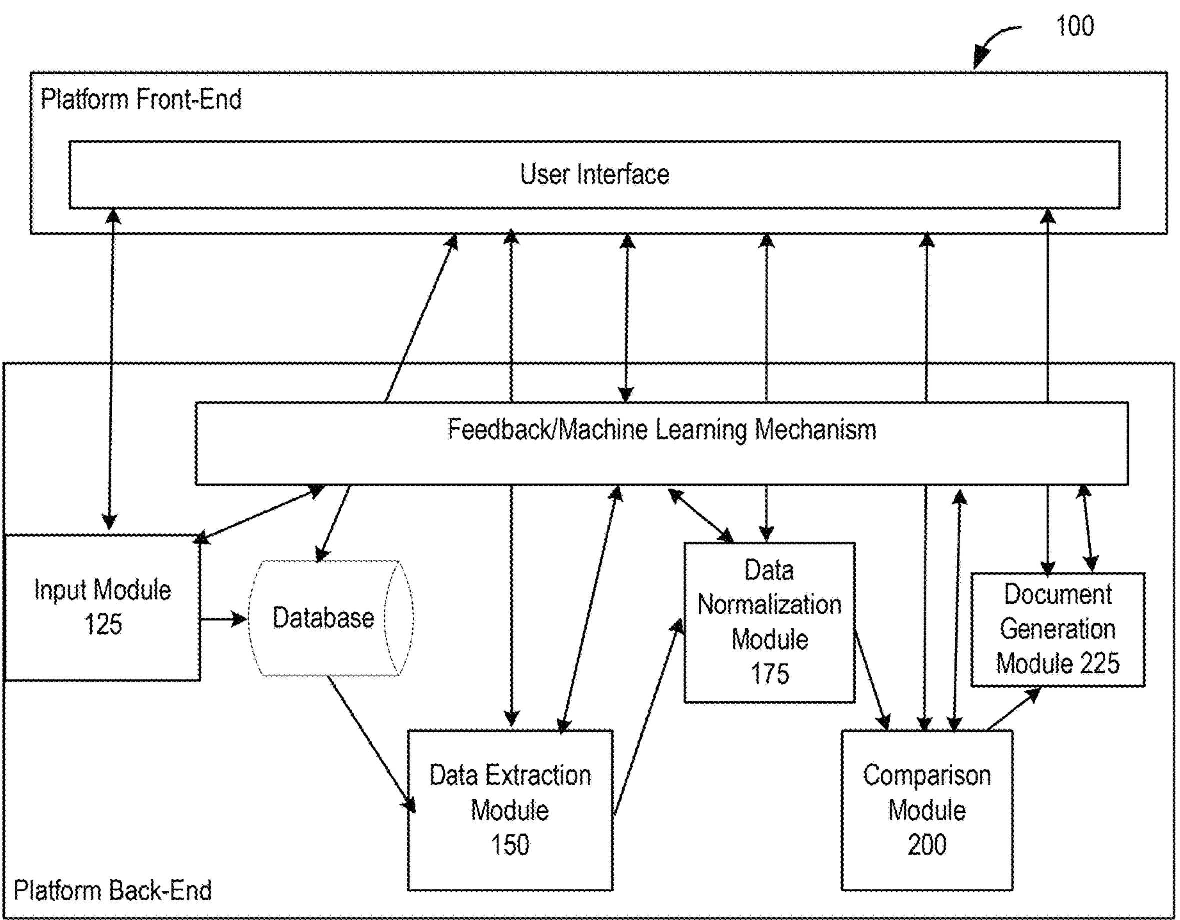
FIG. 1 illustrates a block diagram of an exemplary embodiment of platform 100 in accordance with one aspect of the invention.

The present disclosure relates generally to insurance appraisals. More specifically, but without limitation, the present disclosure relates to systems, methods and apparatuses for comparing and adjudicating insurance appraisals, mediations, arbitration, and pre-appraisal resolution between the insured and the insurer.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

The detailed descriptions which follow are presented in part in terms of algorithms and symbolic representations of operations on data within a computer memory wherein such data often represents numerical quantities, alphanumeric characters or character strings, logical states, data structures, or the like. A computer generally includes one or more processing mechanisms for executing instructions, and memory for storing instructions and data.

When a general-purpose computer has a series of machine-specific encoded instructions stored in its memory, the computer executing such encoded instructions may become a specific type of machine, namely a computer particularly configured to perform the operations embodied by the series of instructions. Some of the instructions may be adapted to produce signals that control operation of other machines and thus may operate through those control signals to transform materials or influence operations far removed from the computer itself. These descriptions and representations are the means used by those skilled in the data processing arts to convey the substance of their work most effectively to others skilled in the art.

The term algorithm as used herein, and generally in the art, refers to a self-consistent sequence of ordered steps that culminate in a desired result. These steps are those requiring manipulations of physical quantities. Usually, though not necessarily, these quantities take the form of electrical or magnetic pulses or signals capable of being stored, transferred, transformed, combined, compared, and otherwise manipulated. It is often convenient for reasons of abstraction or common usage to refer to these signals as bits, values, symbols, characters, display data, terms, numbers, or the like, as signifiers of the physical items or manifestations of such signals. It should be borne in mind, however, that all of these and similar terms are to be associated with the appropriate physical quantities and are merely used here as convenient labels applied to these quantities.

Some algorithms may use data structures for both inputting information and producing the desired result. Data structures facilitate data management by data processing systems and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation. By changing the organization and operation of data structures and the algorithms for manipulating data in such structures, the fundamental operation of the computing system may be changed and improved.

In the descriptions herein, operations and manipulations are sometimes described in terms, such as comparing, sorting, selecting, or adding, which are commonly associated with mental operations performed by a human operator. It should be understood that these terms are employed to provide a clear description of an embodiment of the present invention, and no such human operator is necessary, nor desirable in most cases.

This requirement for machine implementation for the practical application of the algorithms is understood by those persons of skill in this art as not a duplication of human thought, rather as significantly more than such human capability. Useful machines for performing the operations of one or more embodiments of the present invention include general purpose digital computers or other similar devices. In all cases the distinction between the method operations in operating a computer and the method of computation itself should be recognized. One or more embodiments of present invention relate to methods and apparatus for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher-level coding of the instructions that is interpreted to obtain the actual computer code. The software module may also include a hardware component, wherein some aspects of the algorithm are performed by the circuitry itself rather as a result of an instruction.

Some embodiments of the present invention rely on an apparatus for performing disclosed operations. This apparatus may be specifically constructed for the required purposes, or it may comprise a general purpose or configurable device, such as a computer selectively activated or reconfigured by a program comprising instructions stored to be accessible by the computer. The algorithms presented herein are not inherently related to any particular computer or other apparatus unless explicitly indicated as requiring particular hardware. In some cases, the computer programs may communicate or interact with other programs or equipment through signals configured to particular protocols which may or may not require specific hardware or programming to accomplish. In particular, various general-purpose machines may be used with programs written in accordance with the teachings herein, or it may prove more convenient to construct more specialized apparatus to perform the required method steps. The required structure for a variety of these machines will be apparent from the description below.

In the following description, several terms which are used frequently have specialized meanings in the present context. In the description of embodiments herein, frequent use is made of the terms server, client, and client/server architecture. In this context, a server and client are each instantiations of a set of functions and capabilities intended to support distributed computing. These terms are often used to refer to a computer or computing machinery, yet it should be appreciated that the server or client function is provided by machine execution of program instructions, threads, modules, processes, or applications. The client computer and server computer are often, but not necessarily, geographically separated, although the salient aspect is that client and server each perform distinct, but complementary functions to accomplish a task or provide a service. The client and server accomplish this by exchanging data, messages, and often state information using a computer network, or multiple networks. It should be appreciated that in a client/server architecture for distributed computing, there are typically multiple servers and multiple clients, and they do not map to each other and further there may be more servers than clients or more clients than servers. In some cases, a server may refer to a content delivery network (CDN), where a CDN refers to a geographically distributed group of servers which work together to provide fast delivery of Internet content. In some cases, a CDN facilitates quick transfer of assets needed for loading Internet content including, but not limited to, HTML pages, JavaScript files, stylesheets, images, and videos. Typically, CDNs may not host content, but help cache content (or data) at the network edge, which serves to optimize website performance.

In networks, bi-directional data communication (i.e., traffic) occurs through the transmission of encoded light, electrical, or radio signals over wire, fiber, analog, digital cellular, Wi-Fi, or personal communications service (PCS) media, or through multiple networks and media connected by gateways or routing devices. Signals may be transmitted through a physical medium such as wire or fiber, or via wireless technology using encoded radio waves. Much wireless data communication takes place across cellular systems using second generation technology such as code-division multiple access (CDMA), time division multiple access (TDMA), the Global System for Mobile Communications (GSM), Third Generation (wideband or 3G), Fourth Generation (broadband or 4G), Fifth Generation (5G), personal digital cellular (PDC), or through packet-data technology over analog systems such as cellular digital packet data (CDPD).

Additionally, or alternatively, various embodiments may involve transmissions over one or more wireless connections according to one or more 3rd Generation Partnership Project (3GPP), 3GPP Long Term Evolution (LTE), and/or 3GPP LTE-Advanced (LTE ADV) technologies and/or standards, including their revisions, progeny and variants. Some embodiments may additionally or alternatively involve transmissions according to one or more of Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS) technologies and/or standards, including their revisions, progeny and variants.

Examples of wireless mobile broadband technologies may also include without limitation any of the Institute of Electrical and Electronics Engineers (IEEE) 802.16m and/or 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their revisions, progeny and variants. The embodiments are not limited in this context.

In addition to transmission over one or more wireless connections, the techniques disclosed herein may involve transmission of content over one or more wired connections through one or more wired communication medium. Examples of wired communications media may include a wire, cable, metal leads, printed circuit board (PCB), backplane, switch fabric, semiconductor material, twisted-pair wire, co-axial cable, fiber optics, and so forth. The embodiments are not limited in this context.

Embodiments of the present invention provide a software platform that facilitates and revolutionizes the comparison of appraisal documents. In some embodiments, the platform allows a Umpire/Arbitrator to match up property estimates, regardless of the type, and then select the line items they are in agreement to get to an award and a final dispute summary (which is a final estimate of damages broken down my replacement cost value (RCV), actual cash value (ACV), Tax, and overhead and profit amounts. In other embodiments, the platform allows an alternative dispute resolution (ADR) user, to use the document comparison features for pre-appraisal and/or arbitration purposes. For example, in some embodiments the platform incorporates one or more policy deductibles and can generate a form for a release of a claim. The various embodiments contemplated herein may be subject to a subscription and/or one-time price arrangement. The user can register and sign up based on the user's needs.

With reference to the exemplary embodiment illustrated in FIG. 1, the platform 100 comprises a front-end and a back-end. The front-end may comprise a user interface running one or more APIs to facilitate processing data. The back-end may comprise one or more of an input module 125, a data extraction module 150, a data normalization module 175, a comparison module 200, and a document generation module 225 to process information received from the front-end. The back-end may also comprise one or more databases to facilitate the various back-end processes. For example, in some embodiments the one or more databases includes a synonym resolution database that is updated based on user feedback and new document terminology. One or more of the APIs running on the front-end may comprise a cloud app. In various embodiments, one or more APIs interacts with both the front-end and back-end using standard https protocols. In such embodiments, the API are used for the communication and data transfer between the front-end and the back-end.

For example, in one embodiment, one of the API can take a PDF from the front-end, extract all the required values and provide the structured JavaScript Object Notation ("JSON") response to the back-end. The JSON serves as a standardized way to represent the extracted data from a PDF document in a structured format that both the front-end and back-end systems can understand and utilize. The API extracts relevant information from the PDF, such as fields like names, addresses, or numerical values, and organizes it into a JSON structure. For example:

```
{
"documentTitle": "Insurance Claim",
"fields": {
"policyNumber": "12345",
"insuredName": "John Doe",
"claimAmount": 5000,
"dateOfLoss": "2024-12-01"
}
```

The JSON response is sent to the back-end system. This structured format allows the extracted data to be transmitted consistently and efficiently, minimizing errors or misinterpretation. The back-end stores the JSON data in a database for future reference or processing. The JSON structure can also be sent back to the front-end to dynamically populate a user interface, such as a dashboard, where users can view or interact with the data.

In some examples, the various modules may encompass a wide range of artificial intelligence (AI) or machine learning (ML) capabilities as described herein. In various embodiments, the back-end may comprise one or more of a source connector (e.g., Software as a Service API, an API gateway), one or more databases (e.g., S3 database) and/or data stores, a back-end cloud system, and one or more back-end systems. In some embodiments, the back-end of the platform 100 may support API-led integration, where the API-led integration may comprise API management, integration, a connector, and real-time, batch integration. In various embodiments, communication between the modules of platform 100, including the front-end, back-end, and databases, is facilitated through such API integration.

In various embodiments, platform 100 incorporates an asynchronous design to optimize performance and ensure non-blocking operation across back-end processes. For example, in some embodiments, platform 100 uses frameworks such as asyncio to execute tasks on the back-end asynchronously, allowing multiple processes to run concurrently. In various embodiments, this asynchronous architecture facilitates handling extensive datasets or processing large batches of PDF documents, as it minimizes latency and facilitates consistent throughput. In various embodiments, the asynchronous design of platform 100 allows it to be scalable and capable of parallel processing to manage high data volumes and maintain fast response times regardless of workload size.

Figure 2:
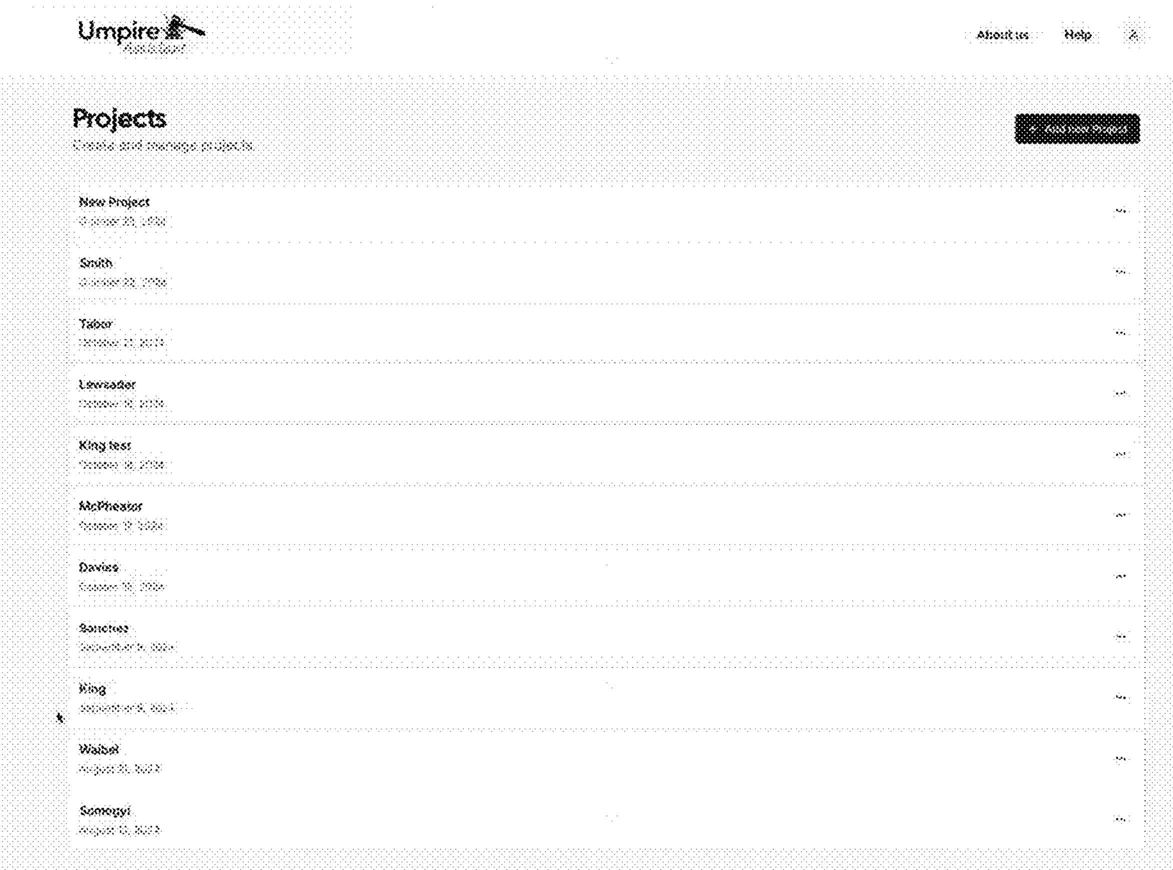
FIG. 2 illustrates a screenshot of an exemplary embodiment of a project screen, in accordance with one aspect of the invention.

With reference to an exemplary embodiment illustrated in FIG. 2, users can purchase a subscription and/or single use access to the platform to perform appraisal comparisons. After registering, a user can log into the platform 100 through the user interface. In some embodiments, platform 100 is configured to present a list of current and previous projects to a user. Platform 100 is also configured to allow users to add new projects. For example, with reference to FIG. 2, a user can click on "Add new Project" to begin a new project.

Figure 3:
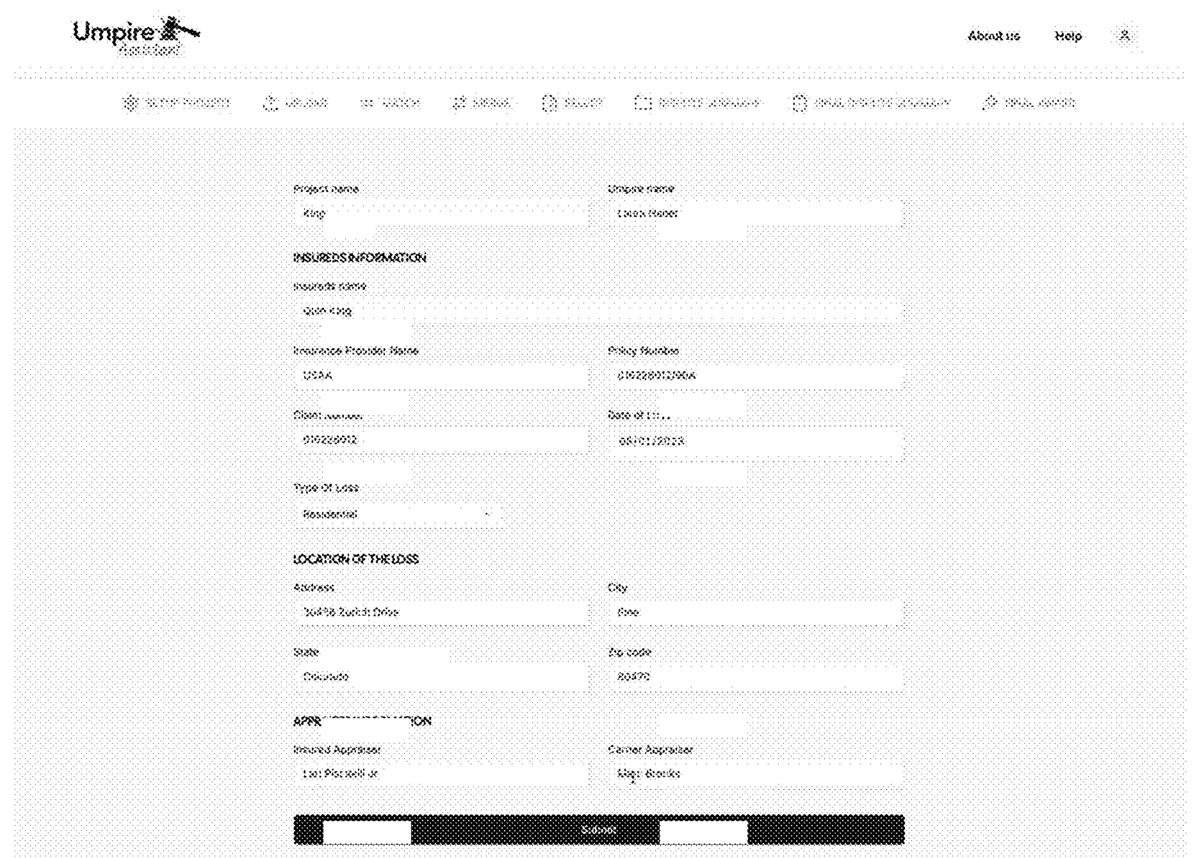
FIG. 3 illustrates a screenshot of an exemplary embodiment of a project screen, in accordance with one aspect of the invention.

In some embodiments, and with respect to an embodiment illustrated in FIG. 3, a user can input various information associated with a project into the user an input module 125 by way of the user interface. For example, this information can include, but is not limited to a project name, an umpire name, the insured's name, the insurance provider, the policy number, a claim number, a date of loss, a type of loss, a location of the loss, and/or information about the appraisers.

Figure 4:
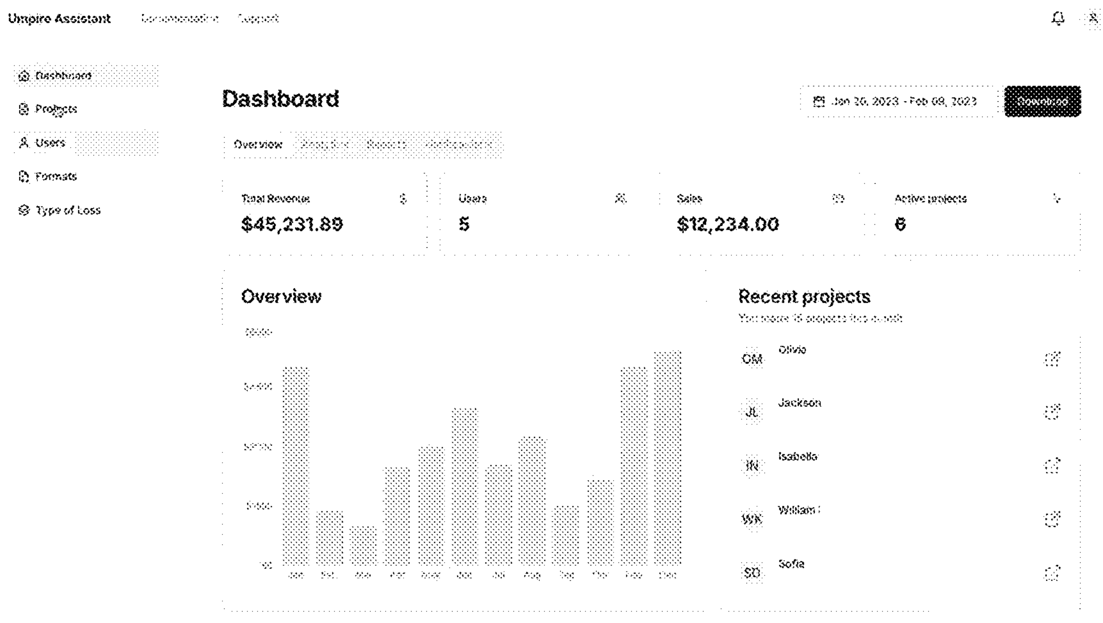
FIG. 4 illustrates a screenshot of an exemplary embodiment of a dashboard, in accordance with one aspect of the invention.

In some embodiments and with reference to an embodiment illustrated in FIG. 4, the platform 100 can include a dashboard that provides various information on analytics, projects, users, and notifications.

Figure 5:
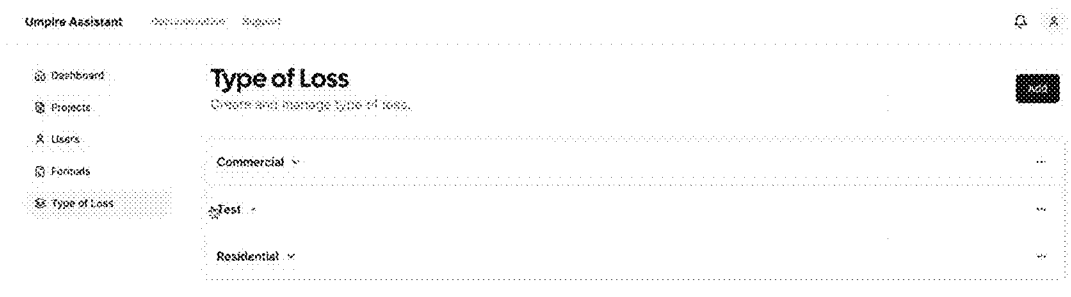
FIG. 5 illustrates a screenshot of an exemplary embodiment of a loss type, in accordance with one aspect of the invention.
Figure 6:
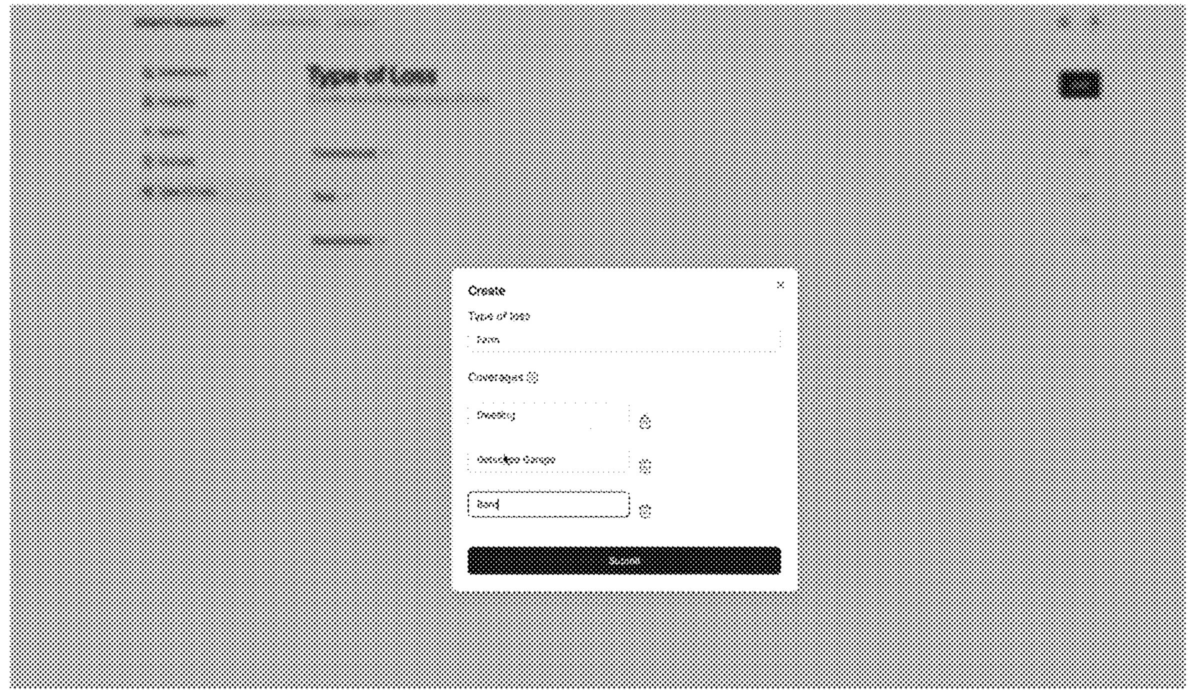
FIG. 6 illustrates a screenshot of an exemplary embodiment of a loss creation screen, in accordance with one aspect of the invention.

In some embodiments, and with reference to an embodiment illustrated in FIG. 5, a user can add a new project into input module 125 by way of a user interface. For example, in some embodiments, the project is based upon the type of loss, such as, for example, commercial, residential, auto, agricultural, and the like. With further reference to an embodiment illustrated in FIG. 6, a user can add a new project and select the type of loss as well as various coverages associated with the loss. For example, dwelling, detached garage, barn, etc. Input module 125 may employ one or more artificial intelligence ("AI"), machine learning ("ML") and or predictive analysis techniques to help standardize and repeat the ingestion data stage. By using these techniques, the system of the present disclosure may help enhance the efficiency and/or accuracy of the data migration process. Furthermore, the APs ability to understand complex data structures, automate repetitive tasks, and adapt to varying data sources may help reduce or minimize manual effort, human errors, etc., as compared to the prior art. In this way, aspects of the present disclosure may enable appraisers and umpires to achieve faster appraisal comparisons to the prior art.

The platform 100 has the ability to streamline a comparison between different appraisals of a loss. For example, with reference to an exemplary embodiment illustrated in FIG. 7, a user can upload documents from both the policyholder and the insurer through the user interface into input module 125. The input module is the entry point for appraisal data and documents, responsible for ingesting and preprocessing files to prepare them for subsequent analysis. In various embodiments, input module 125 accepts documents in diverse formats, including text-based PDFs, scanned PDFs, image files, word documents and unstructured and structured digital forms. In some embodiments, input module 125 provides an intuitive drag-and-drop interface as well as API endpoints for automated uploads.

Because there are no standardized formats for insurance appraisals, each appraisal may be organized in a unique manner and classify different appraised items in different ways, as such, it can be difficult to quickly or readily compare two different appraisals. In some embodiments, once documents are ingested, the input module 125 uses Optical Character Recognition (OCR) algorithms to convert the inputted documents images or image-based PDFs into machine-readable text. Various AI-powered OCR programs can be employed to enhance the automated extraction and processing of text from images, scanned documents, and PDFs. For example, in some embodiments, platform 100 can employ cloud-based solutions on the back-end like Google Cloud Vision API, Amazon Textract, and/or Microsoft Azure Computer Vision. In some embodiments, platform 100 can be configured to use on-premises tools, including ABBYY FineReader and Kofax OmniPage. These OCR programs incorporate features such as Optical Layout Analysis, Natural Language Processing (NLP) for contextual data interpretation, and data extraction capabilities for tables and forms.

In various embodiments, in addition to OCR, input module 125 performs layout analysis and apply customized rules to detect and classify the structural elements of each document, such as column variations, headers, tables, itemized lists, and paragraphs. It also recognizes hierarchical relationships, such as subheadings nested under main headings, to better organize the content. Input module 125 can then send this detected structure to a data extraction module 150 to categorize and label sections accurately (e.g., "Item Description," "Appraised Value").

Figure 8:
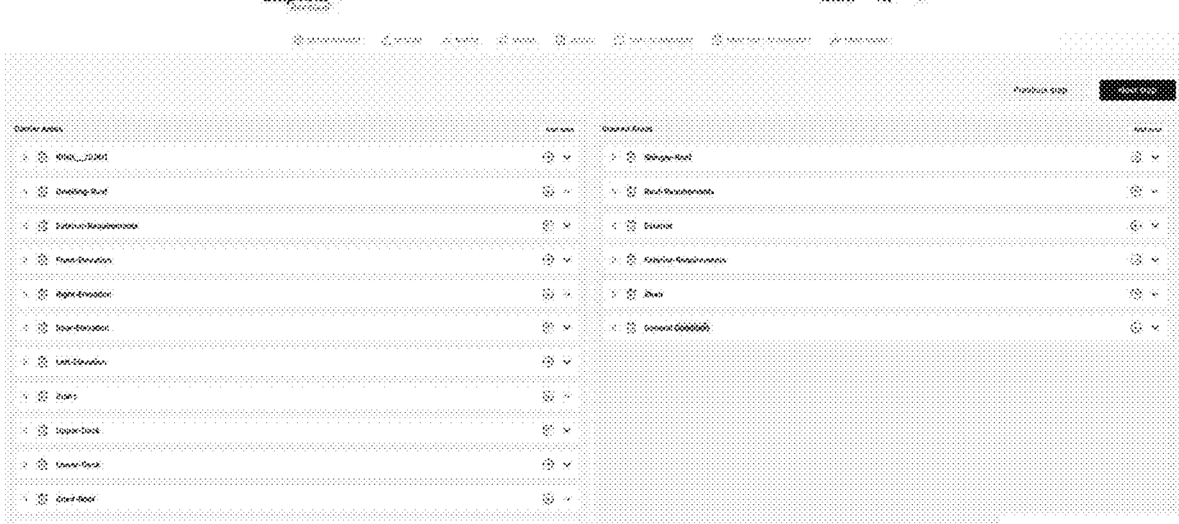
FIG. 8 illustrates a screenshot of an exemplary embodiment of a document arrangement screen, in accordance with one aspect of the invention.

For example, with reference to an exemplary embodiment illustrated in FIG. 8, once the data from each PDF is machine-readable, the Data Extraction Module ("DEM") 150 uses NLP techniques to extract relevant information from each section of the documents. For example, in many embodiments, the DEM 150 employs Named Entity Recognition ("NER") to identify various predetermined data items. For example, with regards to appraisal, DEM 150 can extract such insurance appraisal-specific items such as item names, descriptions, appraised values, and conditions. In various embodiments, DEM 150 also uses pattern recognition to extract numerical values associated with the appraised items. In many embodiments, DEM 150 uses contextual analysis to enhance data extraction by interpreting ambiguous or complex relationships between items and their attributes, facilitating comprehensive and accurate data retrieval. For example, in some embodiments, data is initially extracted using tools such as AWS Textract and OpenAI GPT-4, which analyze the input documents to identify relevant data fields. In various embodiments, input module 125 can extract one or more predetermined data items from the documents, such as insurance appraisal-specific data items.

For example, in context matching, context refers to the semantic meaning or intent of text rather than its exact wording or structure. By analyzing the underlying meaning, DEM 150 can use AI to identify similarities between phrases that differ syntactically but convey the same idea. For example, consider the phrases "Prime & Paint—Exhaust Vent, Roof" and "Prime & paint roof vent." Both describe a painting job for a roof vent, despite differences in phrasing. DEM 150 recognizes the shared context-painting a roof vent and determines a high similarity between the two. Similarly, the phrases "Paint and prime the roof exhaust vent" and "Prime & Paint—Exhaust Vent, Roof" describe the same task despite differences in word order. DEM 150 uses AI to understand the equivalence of these tasks because it evaluates their semantic meaning. This capability is achieved using semantic embeddings, where phrases are represented in a multi-dimensional space, allowing similar meanings to be identified based on their proximity.

In various embodiments, DEM 150 also categorizes the extracted data into predefined fields, such as "Carrier Areas" or "Insured Areas" ensuring structured output. To maintain accuracy, DEM 150 includes mechanisms to flag incomplete or ambiguous data for user review while incorporating fallback rules to handle missing data fields. These capabilities enable the module to automate data extraction processes with high accuracy and scalability, significantly reducing manual effort. In many embodiments, the various extracted fields are presented to a user via an interactive user interface. For example, with respect to FIG. 8, one such user interface is shown that provides the various carrier and insured data. In various embodiments, DEM 150 can employ advanced AI algorithms to handle a wide variety of PDF formats, ensuring robust adaptability across diverse document structures. This functionality is designed to accurately parse and extract relevant information, irrespective of differences in formatting, layout, or structure, thereby significantly improving the versatility of the system.

For example, with the integration and implementation of AI extraction functionality, data extraction now works across a wide variety of PDF formats, which was not previously possible due to limitations in static methods. Earlier, AWS Textract was used to extract data, with rigid regex patterns created for matching. These patterns failed when new or unseen PDF patterns emerged, making the process inflexible. Platform 100's integration with OpenAI enables dynamic handling by understanding and extracting data from diverse PDF layouts, adapting seamlessly to new patterns without requiring pre-defined regex. Unlike regex, Platform 100's integration with OpenA's AI-powered extraction also comprehends context, making it effective for complex or ambiguous formats. Additionally, embeddings are employed to measure semantic similarity when matching extracted data, ensuring high accuracy even when terminology or structures vary.

In many data extraction embodiments related to appraisal documents, custom rules are applied to map extracted data into a JSON schema. When extracting financial data, numeric values such as replacement cost value (RCV) and actual cash value (ACV) must be extracted accurately, with additional calculations performed where needed, such as summing values from the "Remove," "Replace," and "Reset" columns for unit_price. The extracted data is then organized into key-value pairs within a structured JSON format. Non-relevant text, such as headings like "Summary" or notes below descriptions, is excluded to maintain clarity. Parsing rules ensure the accuracy of calculated fields, including unit_price, RCV, and ACV, while ensuring all numbered rows are included in the extraction and handling fractional and decimal values precisely. Special attention is given to adapt to varying column structures for proper mapping. An exemplary data mapping into key-value pairs within a JSON structure is provided:

```
{
  "Kitchen": [
  {
  "description": "1. Dumpster load - Approx. 20",
  "quantity": "1.00 EA",
  "unit_price": "519.50",
  "tax": "0.00",
  "o_p": "103.90",
  "rcv": "623.40",
  "deprec": "0.00",
```

-continued

"acv": "623.40"
}
]
}

Because extracted data often originates from appraisal documents with varying formats and terminologies, platform 100 can also include a Data Normalization Module 175 to standardize the data into a unified format. For example, in various embodiments, the Data Normalization Module 175 applies schema mapping, which involves converting diverse data formats into a predefined structure or format to achieve more consistency. For example, in some embodiments, the system applies a custom JSON schema to standardize and structure the extracted data into predefined key-value pairs, including fields such as "description," "quantity," and "unit_price." This schema ensures consistent formatting of data, regardless of the variability in the structure or labeling of source documents. Furthermore, the system incorporates customized rules to handle discrepancies in column names or formats across different documents, dynamically adapting to diverse layouts to ensure accurate alignment with the schema. For example, in some embodiments, Data Normalization Module 175 applies rules to exclude certain texts, visual diagrams, notes, and/or the like to help ensure that the extracted data focuses solely on the relevant line items and their associated properties, reducing noise and improving data usability. For example, in many embodiments, the exclusion of unwanted data includes rules to ensure that the output response is structured and consistent for all the responses consumed by the front-end. One example of a rule is:

[
{
"description": "5. Refrigerator - Remove & reset",
"quantity": "1.00 EA",
"unit_price": "64.36",
"o_p": "12.88",
"tax": "0.00",
"rcv": "77.24",
"deprec": "0",
"acv": "77.24"
}
]

In various embodiments, the Data Normalization Module 175 handles hierarchical data, such as categorizing "Building" as a parent entity with subcategories like "Roofing" and "Plumbing." In various embodiments, data normalization module applies schema mapping to align the one or more predetermined data items a to a predefined structure and/or and resolve terminological inconsistencies using synonym resolution.

For example, in various embodiments, Data Normalization Module 175 can apply synonym resolution, which uses a synonym database and/or machine learning algorithms to map different terms (e.g., "assessed value" vs. "valuation") to the same entity type to facilitate appraisal comparisons. For example, in various embodiment Data Normalization Module 175 employs the OpenAI GPT model to perform synonym resolution with advanced semantic understanding capabilities, enabling accurate matching of multiple descriptions across disparate documents. For example, in various embodiments, OpenAI's text-embedding-ada-002 model is used to generate semantic embeddings for each description. In such embodiments, the deep learning architecture is used to identify and interpret contextually similar terms or phrases, mapping them to a unified entity type.

In some embodiments, comparison module 200 and/or Data Normalization Module 175 can compute a cosine similarity between the embeddings of descriptions to measure their semantic similarity. If the multiple description are matching then the pair with the highest cosine similarity score is selected as the best match. Once a pair is matched, both elements are excluded from the matching process, preventing them from participating in subsequent comparisons and avoiding duplication.

In addition, in various embodiments, comparison module 200 and/or Data Normalization Module 175 can employ custom logic to address scenarios involving complex or domain-specific descriptions. This custom logic allows comparison module 200 and/or Data Normalization Module 175 to apply user-defined rules or heuristics, ensuring that nuanced variations in language or terminology are correctly aligned. For instance, when multiple descriptions for the same item appear in different formats or with additional qualifiers, comparison module 200 and/or Data Normalization Module 175 uses both contextual analysis and predefined logic to determine equivalencies and provide consistent mapping.

In many embodiments, Data Normalization Module 175 also performs data transformation, normalizing date formats, numerical units, and categorical values to ensure uniformity. Additionally, Data Normalization Module 175 identifies and corrects inconsistencies, such as duplicated entries or conflicting field values. In other embodiments, Data Normalization Module 175 utilizes a clustering algorithm to group similar appraisal line items and automatically reconcile duplicated or inconsistent entries.

Figure 9:
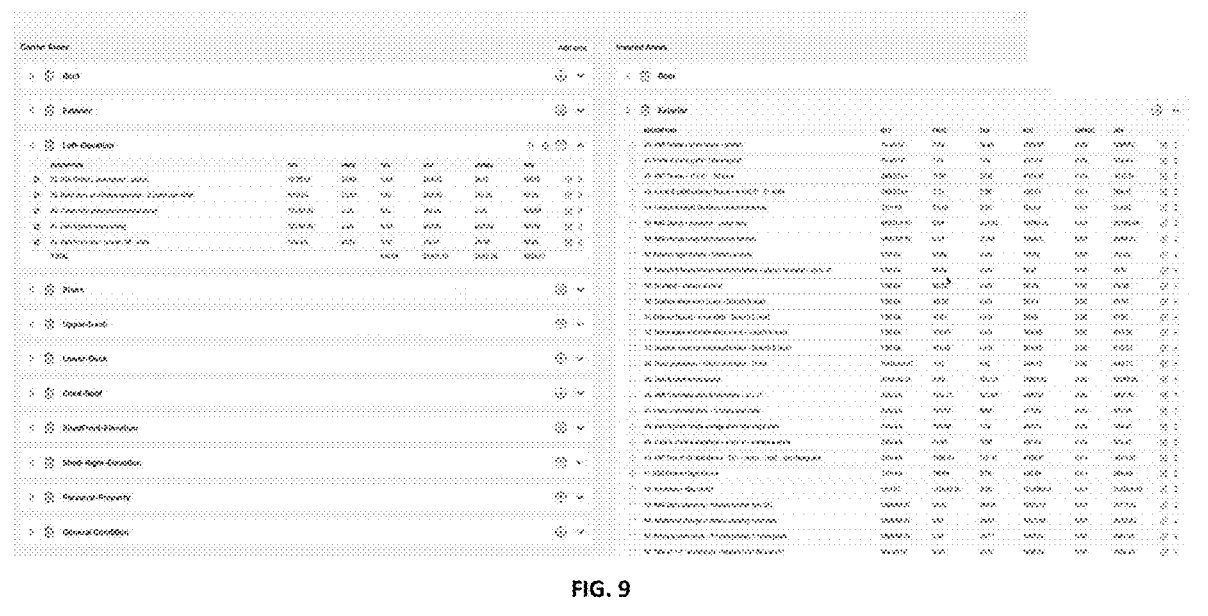

With reference to exemplary embodiments illustrated in FIG. 9, the comparison module 200 and/or Data Normalization Module 175 can communicate processed information to the user interface to present a general overview of the different fields on each appraisal. A user can go through and determine what line items are included in each respective appraisal field, and can manually edit or reorganize the line items as desired.

Figure 10:
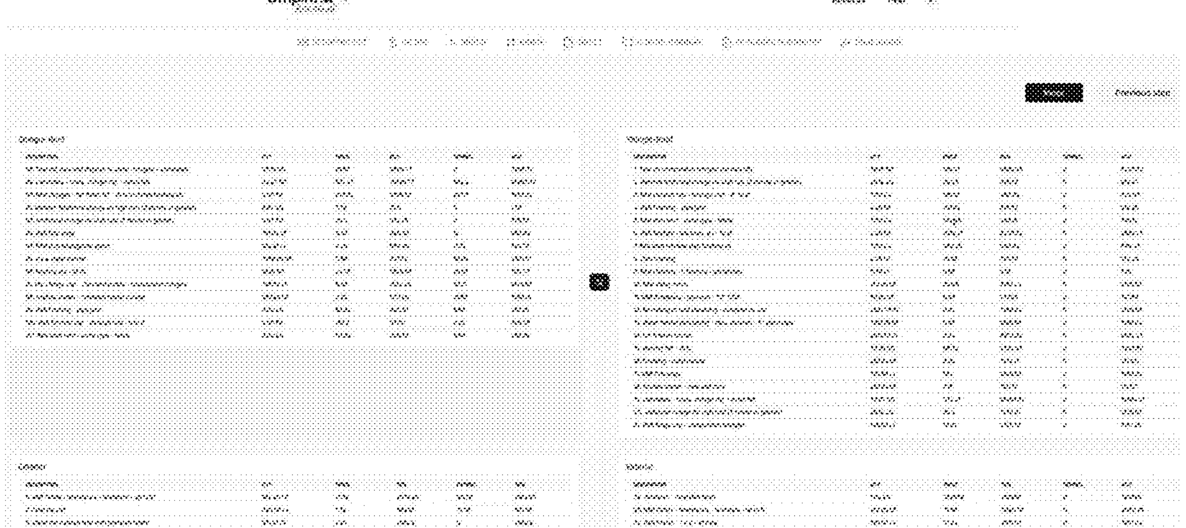
FIG. 10 illustrates a screenshot of an exemplary embodiment of a document comparison screen, in accordance with one aspect of the invention.

With reference to an exemplary embodiment illustrated in FIG. 10, the user interface of platform 100 communicates with a comparison module 200, which aligns and compares the standardized data from both appraisals to identify discrepancies (i.e., differences in appraised values), matches, and missing items. For example, in various embodiments, the information from each appraisal can be shown to a user as a side by side comparison. In many embodiments, comparison module 200 uses advanced fuzzy matching algorithms, and it can pair corresponding items even if there are minor discrepancies in their descriptions, and it can align the estimates in a side-by-side manner. In many embodiments, comparison module 200 highlights differences in appraised values, item conditions, and other attributes. Additionally, comparison module 200 flags items present in one appraisal but missing in the other. In many embodiments, comparison module 200 generates a detailed visual report that displays the matched items from each appraisal side by side, with discrepancies clearly marked. For example, in some embodiments, comparison module 200 calculates and displays confidence scores for each matched line item, based on similarity metrics derived from fuzzy matching algorithms. Users can interact with this report to gain insights into the differences between the two appraisals.

Figure 11:
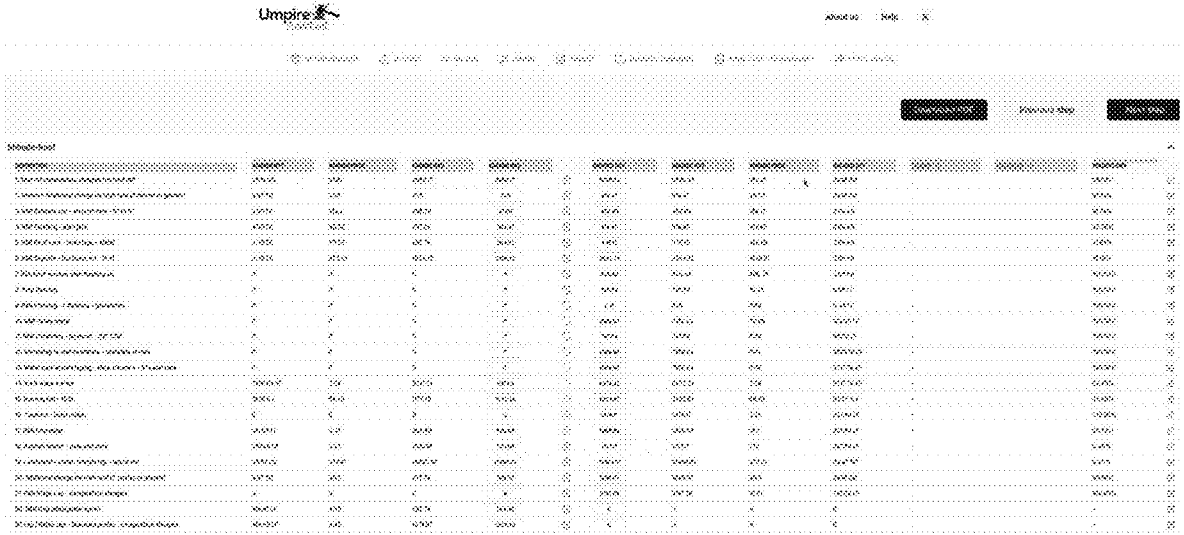
FIG. 11 illustrates a screenshot of an exemplary embodiment of an item selection screen, in accordance with one aspect of the invention.

Another improvement offered by the system is the ability to present comparison results through an interactive user interface, which includes detailed visualizations and actionable insights. In many embodiments, user interface interacts with the user interface provides a visual, interactive platform for users to interact with the appraisal data. For example, with reference to FIGS. 11 and 12, the user interface provides a dashboard view that summarizes the comparison results, including the number of discrepancies and matched items. In many embodiments, the user interface provides the user with various options to filter and sort data based on various criteria. For example, in some embodiments, the user interface provides the ability to sort by keyword or feature. In addition, with reference to exemplary embodiments illustrated in FIGS. 12 and 13, platform 100 allows an umpire to select, item by item, between a carrier's and an insured's appraisals in order to generate a recommendation. Traditional methods often rely on static reports that are difficult to interpret and provide limited interactivity. In contrast, the platform's user interface allows users to sort, filter, and interact with discrepancies, enabling faster resolution of conflicts. This real-time interaction enhances decision-making efficiency and reduces the time required to reconcile differences between appraisals.

Figure 12:
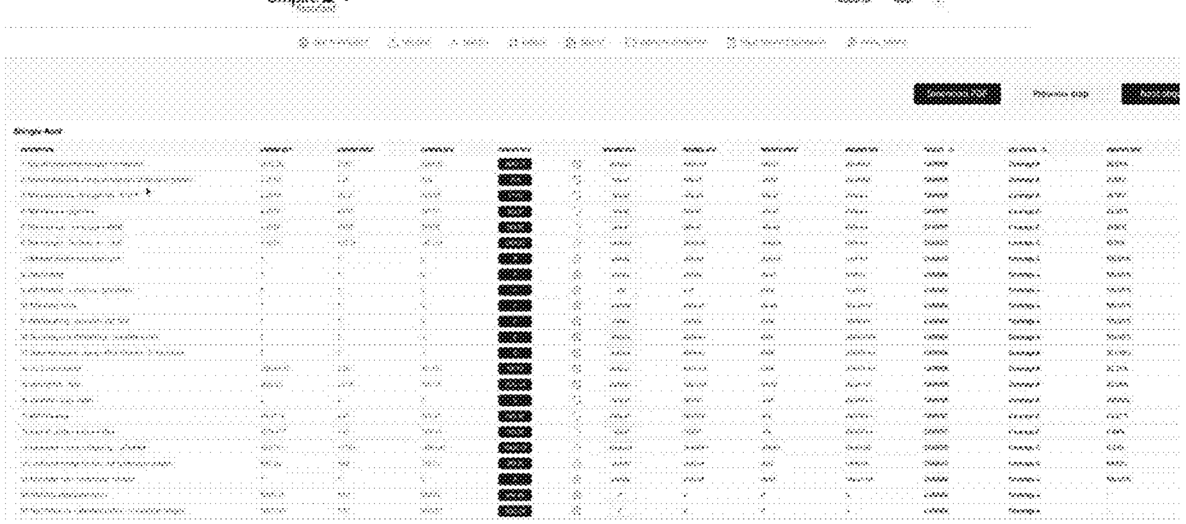
FIG. 12 illustrates a screenshot of an exemplary embodiment of an item selection screen, in accordance with one aspect of the invention.
Figure 13:
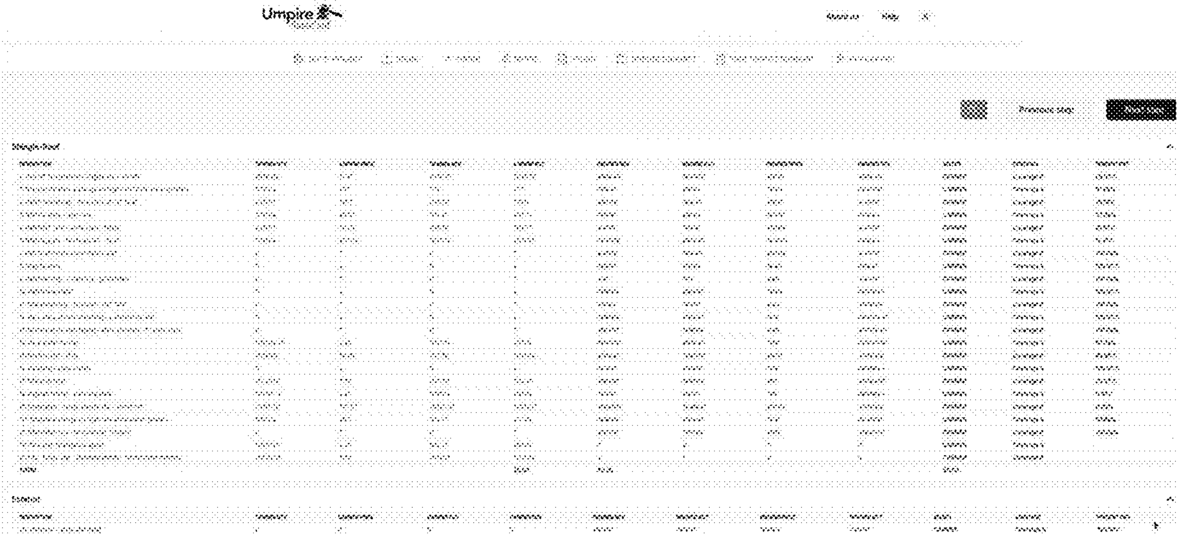
FIG. 13 illustrates a screenshot of an exemplary embodiment of a summary screen, in accordance with one aspect of the invention.

For example, with respect to an exemplary embodiment illustrated in FIG. 12, comparison module 200 allows a user to group move multiple entries to different locations. In some embodiments, comparison module 200 provides an "add area" feature to enable the creation of fields in one or more documents to better enable alignment, thereby improving computer functionality by reducing the amount of data processed since all descriptions in a carrier estimate are aligned or alignable with the insured estimate.

In various embodiments, the user interface provides interactive visualizations of the comparison results, including dynamic charts and tables that summarize discrepancies and highlight statistically significant differences. For example, in some embodiments, the user interface provides graphical visualizations of discrepancies between appraisals, for example, heatmaps and other interactive tools for comparison. As such, an umpire can determine with appraiser is more accurate. In some embodiments, the user interface includes one or more tools to simulate adjustments to appraisal weights and values to view real-time impacts on the appraisals. For example, in some embodiments, the user interface utilizes machine learning to provide recommendations to mediate potential discrepancies between appraisals based upon historical user behavior and domain-specific knowledge.

Figure 14:
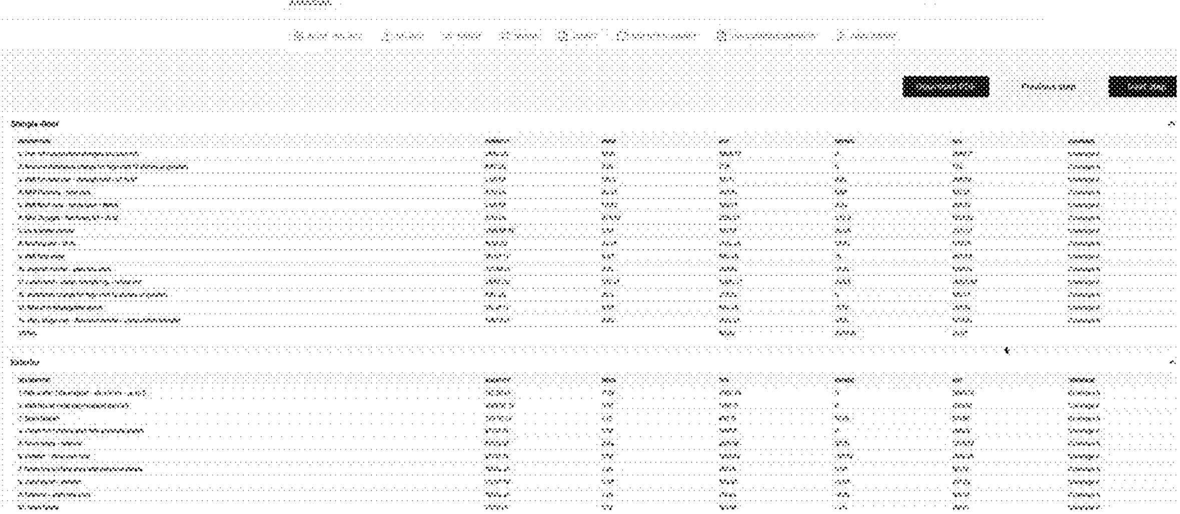
FIG. 14 illustrates a screenshot of an exemplary embodiment of a summary screen, in accordance with one aspect of the invention.

In some embodiments, the user interface includes a feedback mechanism, that allows users to correct mismatches or validate the system's comparisons. This feedback mechanism communicates with machine learning and artificial intelligent algorithms to provide dynamic improvement of the accuracy of platform 100. For example, with reference to exemplary embodiments illustrated in FIG. 14, a summary page is presented that summarizes the various selections made by the user between the carrier's and insured's appraisals.

These selections can be reformatted into single document (i.e. an award form) issued by the Umpire. For example, with reference to an exemplary embodiment illustrated in FIG. 15, platform 100 uses a document generation module 225 to generate a single document for download based on various estimates by the insured's and carrier's appraisers, as well as any addition umpire custom estimates. In many embodiments, document generation module 225 allows customization of the text appended to the document, based upon the selected appraisal items. In many embodiments, the merge feature of document generation module 225 facilitates the creation of a document wholly unrelated to any prior art document as it effectively creates a single estimate from the insured and carrier estimates. In various embodiments, document generation module 225 enables modification of this single document to create a final estimate and an award document Previously, an umpire would need to self-generate a document after laboriously comparing competing appraisals, whereby the umpire would need to input various amounts into the final document. With platform 100, the document is generated by the document generation module 225 after applying the various modules and algorithms contemplated herein.

In many embodiments, document generation module 225 can function as an electronic signature and document management platform that allow users to securely sign, send, and manage agreements digitally. That is, the document generation module can electronically send the document to the insured and/or carrier for review, approval, and/or signature. In many embodiments, document generation module 225 generates a signature field that accepts text, initials, dates, and/or or drawn signatures into the signature field.

In many embodiments, document generation module 225 employs various identity verification methods to ensure the authenticity of users signing documents. For example, in various embodiments, document generation module 225 uses one or more of email authentication, where a secure link is sent to the recipient's email, and access to the document confirms their email address; access codes, which are shared with recipients outside the platform and must be entered before viewing the document; SMS authentication sends a one-time passcode (OTP) to the recipient's phone; Knowledge-Based Authentication (KBA), where recipients answer personal or financial questions derived from public records; Identity Verification (IDV) that requires recipients to provide and verify a government-issued ID, sometimes with an additional selfie to match the ID photo; certificate-based authentication that uses digital certificates issued by trusted authorities; single sign-on (SSO), which allows users to authenticate using an organization's existing login credentials; and/or biometric authentication, such as facial recognition or fingerprint scanning. In many embodiments, each of these methods is complemented by an audit trail, which logs all user interactions, ensuring a comprehensive record of the signing process and reinforcing document integrity.

As described herein, in various embodiments, platform 100 uses one or more machine learning components and/or algorithms to continuously improve the its performance. In some embodiments, the machine learning component uses supervised learning to improve the accuracy of data extraction and item matching. That is, as users provide feedback on the platform's 100 performance, the machine learning component can apply one or more reinforcement learning algorithms to adapt to this input and refine the models used for the comparison. In many embodiments, platform 100 uses this machine learning component to update its NLP and matching models to handle new appraisal formats and terminology. For example, in various embodiments, platform 100 uses this machine learning component and user-provided feedback to refine data extraction and comparison accuracy.

In various embodiments, platform 100 comprises a machine learning component consisting of several interconnected subsystems. One such system, is a model training subsystem that relies on historical appraisal datasets and user-generated feedback to ensure models are contextually relevant and accurate. In addition, the machine learning component can comprise a feedback engine that captures user interactions, such as corrections to extracted fields or comparisons, and uses reinforcement learning techniques to refine the models dynamically. The feedback engine enables the platform 100 to improve iteratively based on real-world usage. In various embodiments, the machine learning component includes an updating framework, which uses incremental learning and fine-tuning to accommodate new appraisal formats and terminologies. For example, in some embodiments, the feedback engine continuously updates the natural language processing models with supervised learning techniques using user-provided corrections to the one or more predetermined data items. In addition, the updating framework allows for platform 100 to be updated seamlessly in real-time without disrupting its operations. In various embodiments, machine learning includes a prediction module that proactively identifies potential errors or discrepancies and provide suggestions to the discrepancies based on historical user behavior and domain-specific knowledge.

In various embodiments, machine learning enhances the OCR capabilities of platform 100. For example, by employing image classification and feature extraction techniques, including convolutional neural networks (CNNs), platform 100 can handle variations in font, alignment, and image quality. As such, the OCR models of platform 100 are trained to recognize domain-specific terminology and structures commonly found in insurance appraisals, ensuring that even noisy or poorly scanned documents are accurately processed.

In addition to OCR, the machine learning component of platform 100 incorporates advanced Natural Language Processing (NLP) techniques. Using pre-trained language models such as BERT or GPT, fine-tuned on insurance-specific corpora, the system employs Named Entity Recognition (NER) to identify key fields like "appraised value" or "condition." The machine learning component can use semantic similarity analysis to understand relationships between extracted fields as well as contextual parsing to resolve ambiguities by linking related elements, such as associating an "item description" with its corresponding value or condition.

In various embodiments the machine learning component of platform 100 also optimizes data normalization by standardizing diverse terminologies and schemas. For example, the machine learning component can use schema mapping to align extracted data with predefined structures, and synonym resolution to map various terms to a common standard using word embeddings such as Word2Vec or GloVe. The normalization process ensures that data from disparate sources is unified, enabling accurate downstream comparisons. Additionally, machine learning can employ clustering algorithms to detect and resolve duplicate entries or conflicting information.

In various embodiments, to facilitate robust comparison, platform 100 incorporates advanced fuzzy matching algorithms augmented with machine learning. For example, platform 100 can employ pairwise comparison models to predict whether two fields represent the same entity, even when descriptions differ. These models use features such as textual similarity, numerical closeness, and contextual relevance to compute similarity scores. As such, platform 100 can dynamically assign weights to different appraisal fields, prioritizing key attributes like appraised values over secondary details. In addition, as users validate or correct data in platform 100, their feedback is used to adjust the model parameters of platform 100, thereby dynamically adapting platform 100 to new formats and unforeseen scenarios.

In various embodiments, platform 100 employs a customized fuzzy matching algorithm that uses OpenAI's embedding models to achieve semantic text matching with high accuracy and adaptability. For example, in some embodiments, the system utilizes the text-embedding-ada-002 model to generate embeddings, which are vector representations capturing the semantic meaning of textual inputs. In many embodiments, a vector representation of text is a numerical way of encoding textual data so that it can be processed and analyzed by computers. This process involves tokenization, where text is divided into smaller units like words, phrases, or characters. These tokens are then mapped to numerical formats, typically as vectors, enabling machines to interpret and manipulate the information. In some embodiments, text vectorization includes methods such as Bag of Words (BoW) and Term Frequency-Inverse Document Frequency (TF-IDF). In many embodiments, additional techniques to leverage word embeddings are used, such as Word2Vec, GloVe, Doc2Vec, Universal Sentence Encoder (USE), and BERT. An example of embeddings for Prime & Paint appraisals for the Exhaust Vent of a Roof are attached as Appendix A.

To determine similarity, the system computes the cosine similarity between these embeddings. If the resulting similarity score exceeds a configurable threshold—for example, 85%—the texts are considered a match. This threshold can be modified and is not limited to any particular percentage. Unlike traditional fuzzy matching algorithms, such as those based on Levenshtein distance, which primarily assess character-level similarity, this approach focuses on semantic similarity. This allows the system to effectively match texts with different structures or wordings but similar meanings, significantly enhancing its ability to align information from disparate sources. This tailored implementation enables robust and context-aware matching, supporting diverse applications such as data normalization, document comparison, and content integration.

In many embodiments, custom logic is employed to handle differences in column naming or format across data sets. These such custom logic include a cosine similarity calculation, a matching process, handling unmatched descriptions and avoiding duplications as described herein. For example, in some embodiments, duplications are managed through a systematic process to ensure unique pairings. In insurance appraisal embodiments, once a pair of descriptions from "insured" and "carrier" is successfully matched, both items are excluded from further iterations to prevent redundant pairings. Matched descriptions are added to a tracking list (e.g., carrier_description), and during subsequent comparisons, any descriptions already in the list are skipped. Matches are sorted by their similarity scores in descending order, prioritizing the highest-scoring pairs for processing. This approach ensures that each description is processed only once, with only unique pairs of matched descriptions included in the final JSON output. In such embodiments, example logic that is employed may be the following:

```
matched_insured = ["Remove debris"]
matched_carrier = ["Clean debris"]
Skip these descriptions in future comparisons.
{
  "description": "Remove debris",
```

-continued

```
        "insured": {
          "description": "Remove debris"
        },
        "carrier": {
          "description": "Clean debris"
        }
      }
```

In many embodiments, platform 100 uses customized algorithms that function with off-the-shelf embedding models. For example, in some embodiments, after obtaining embeddings from OpenAI's text-embedding-ada-002 model, platform 100 computes a cosine similarity to measure the semantic alignment between descriptions. In various embodiments, custom functionality is employed to match descriptions from both the carrier and insured sides. Each unmatched description is repeatedly compared to ensure thorough and accurate pairings. Descriptions that remain unmatched during the process (from either the carrier or insured side) are identified and treated separately. Once a match is confirmed, the matched elements are excluded from further iterations, preventing duplicate pairings and ensuring that each description is processed only once. In many embodiments, the entire flow, from cosine similarity computation, to matching, to handling unmatched and duplication to sending the response in JSON is custom python script.

For example, in some embodiments, descriptions that do not meet the predefined similarity threshold (e.g., 0.85) are categorized as unmatched. For insurance appraisal embodiments, both "insured" and "carrier" unmatched descriptions are included in the final JSON output to ensure no information is lost, with placeholders added to indicate the absence of a match from either side. An example of a JSON output is provided below for an unmatched "insured" description:

```
{
  "description": "Replace roof tiles",
  "insured": {
  "description": "Replace roof tiles"
  },
  "carrier": {
  "description": ""
  }
}
```

For an unmatched "carrier" description:

```
{
  "description": "R&R Cabinetry - lower (base) units -",
  "insured": {
  "description": ""
    },
  "carrier": {
  "description": "R&R Cabinetry - lower (base) units -"
  }
}
```

Additionally, users can manually match descriptions through drag-and-drop operations on the user interface, providing flexibility and greater control over the handling of unmatched data. In various embodiments, platform 100 utilizes machine learning for error prediction and prevention. For example, platform 100 uses supervised learning models trained on historical appraisal data to identify patterns of common errors and flag potential discrepancies in real time. This proactive approach not only minimizes manual intervention but also boosts confidence in the platform's outputs. For example, platform 100 can rely upon training data sourced from annotated appraisals, synthetic datasets designed to simulate edge cases, and real-world user feedback. In some embodiments, platform 100 can generate results based upon historical decisions by preferred appraisers or historical umpire outcomes. Platform 100 can utilize various metric models to evaluate performance, such as precision, recall, and F1 scores for data extraction and matching accuracy.

In many embodiments, platform 100 includes a clock or timer feature, which enhances user functionality by enabling the tracking of time spent resolving document discrepancies. This clock/timer can be initiated when a user begins working on a specific task within the application and paused or stopped as necessary. The tracked time is logged automatically in association with the corresponding resolution task. This time-tracking functionality serves dual purposes. First, it allows users to monitor their productivity and time management, providing insights into the duration required to address particular resolution activities. Second, it can be used by professionals who bill clients based on hourly work. The system can generate detailed time logs, combining hours spent directly within the application and external work related to the task. These logs can then be exported in formats compatible with standard billing and invoicing systems, streamlining the workflow for users such as legal or appraisal professionals.

In many embodiments, the integration of this clock/timer into the overall system is seamless. It functions alongside platform 100's primary workflows, including the document processing and comparison modules, ensuring that users have a comprehensive record of both their activities and the time dedicated to each task.

Figure 16:
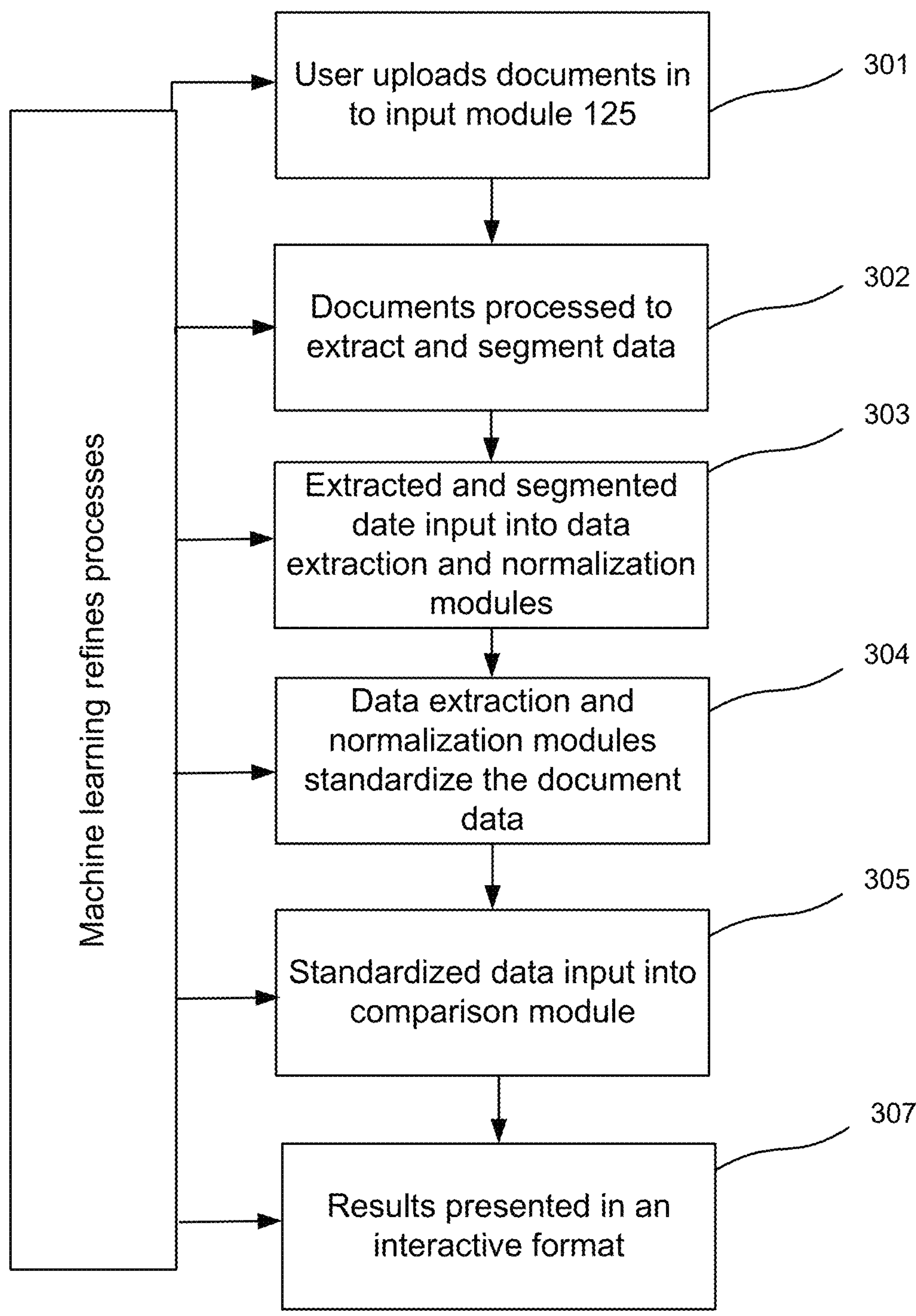
FIG. 16 illustrates an exemplary method in accordance with one aspect of the invention.

Various methods of employing machine learning to facilitate appraisal comparisons are contemplated herein. For example, in an exemplary embodiment illustrated in FIG. 16, one or more users begin by uploading two or more documents (i.e. appraisal documents) into the input module 125 (step 301). The input module processes the PDF files by extracting both text and images using a custom function, process_pdf_text, which processes the content of the PDF. Each page is then saved as an image and encoded for further use. This extracted and segmented data is immediately passed to the data extraction module (step 302). Integration with OpenAI then processes the extracted text and images asynchronously via the process_images_async function, handling a variety of PDF formats efficiently. The extracted text and images are sent the data normalization module (step 303) to begin data matching.

The data matching workflow starts with JSON serialization, where incoming data is saved to a timestamped directory for traceability. The serialized JSON files are processed using the json_serialization function to generate insured and carrier-specific files. Once the data is standardized and serialized, it is input into the comparison module (step 304) for direct comparison. For comparison, the system uses compare_json_files_async to compare the insured and carrier JSON data asynchronously. The comparison results are then merged with another JSON file using merge_json_files, producing a consolidated dataset, which is returned as the final output.

In many embodiments, the method uses advanced machine learning models to process the data asynchronously, enabling efficient and accurate comparisons despite variations in document formats. The comparison results are displayed in an interactive format via the user interface (step 305), where the user can review, validate, and provide feedback. This feedback loop allows the system to continuously refine the accuracy of its comparisons, ensuring improved results over time. For example, in the background of steps 301-307, the machine learning component can receive feedback and user input at any stage to develop more accurate appraisal comparisons (step 308).

In some embodiments, the various modules and components described herein comprise the same component. In some embodiments, one or more of the input module, data extraction module, data normalization module, comparison module or machine learning component comprises one or more of the input module, data extraction module, data normalization module, comparison module or machine learning component.

Figure 17:
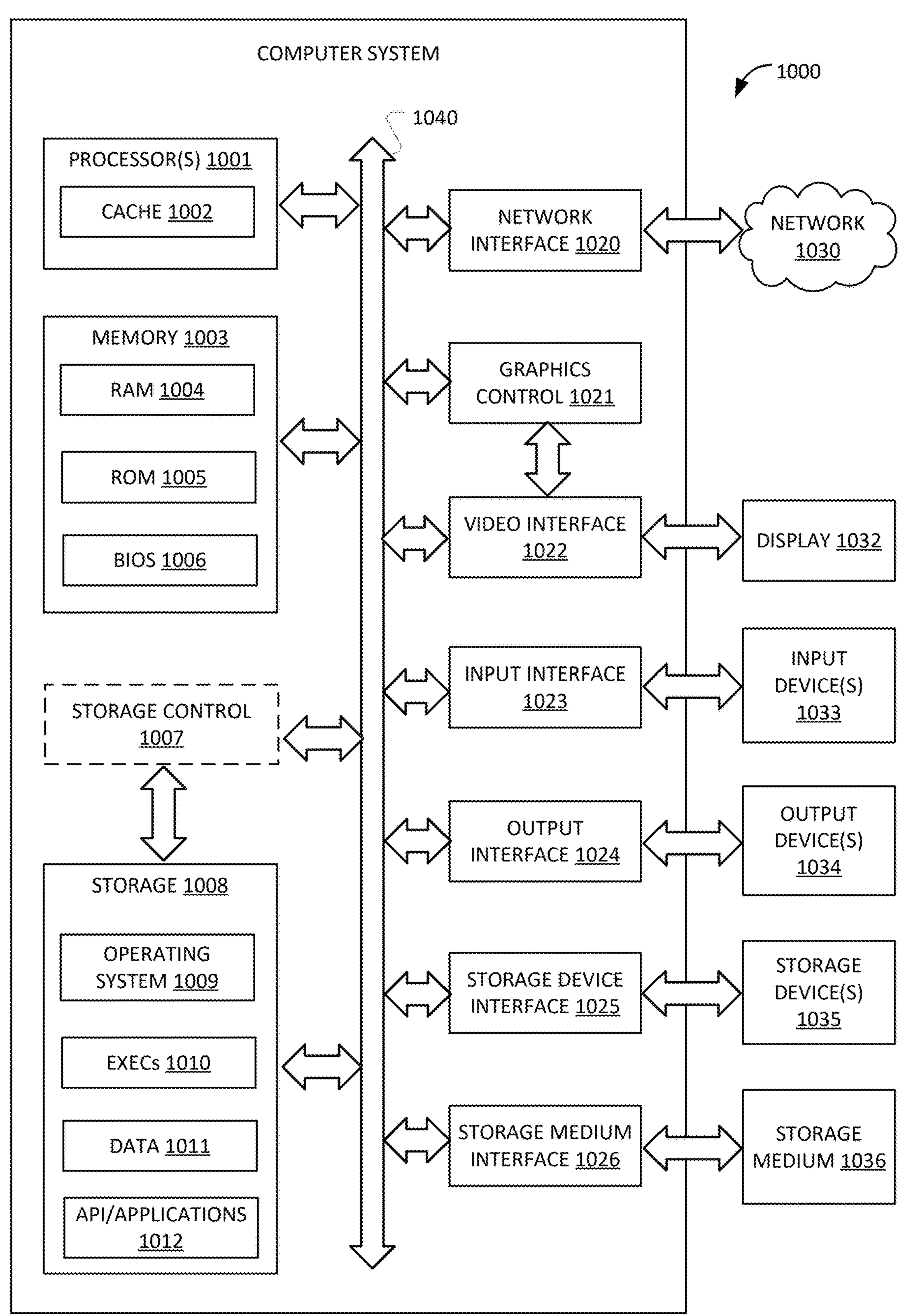
FIG. 17 illustrates a diagrammatic representation of one embodiment of a computer system in accordance with one aspect of the invention.

FIG. 17 illustrates a diagrammatic representation of one embodiment of a computer system 1000, within which a set of instructions can execute for causing a device to perform or execute any one or more of the aspects and/or methodologies of the present disclosure. The components in FIG. 17 are examples only and do not limit the scope of use or functionality of any hardware, software, firmware, embedded logic component, or a combination of two or more such components implementing particular embodiments of this disclosure. Some or all of the illustrated components can be part of the computer system 1000. For instance, the computer system 1000 can be a general-purpose computer (e.g., a laptop computer) or an embedded logic device (e.g., an FPGA), to name just two non-limiting examples.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In some embodiments, the non-volatile memory unit stores instructions and/or data even when the computer system 1000 is off. In addition, those of ordinary skill in the art will recognize that hardware such as field programmable gate arrays (FPGAs) may be utilized to implement one or more of the constructs depicted herein.

Computer system 1000 includes at least a processor 1001 such as a central processing unit (CPU), a graphics processing unit (GPU), another processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor such as a dual-core processor or dual-core mobile processor, or any other microprocessor or central processing unit (CPU). The processor 1001 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. The embodiments are not limited in this context. Any of the subsystems described throughout this disclosure could embody the processor 1001.

The computer system 1000 may also comprise a memory 1003 and a storage 1008, both communicating with each other, and with other components, via a bus 1040 (e.g., a wired and/or wireless bus). The bus 1040 may also link a display 1032, one or more input devices 1033 (which may, for example, include a keypad, a keyboard, a mouse, a stylus, etc.), one or more output devices 1034, one or more storage devices 1035, and various non-transitory, tangible computer-readable storage media 1036 with each other and/or with one or more of the processor 1001, the memory 1003, and the storage 1008. All of these elements may interface directly or via one or more interfaces or adaptors to the bus 1040. For instance, the various non-transitory, tangible computer-readable storage media 1036 can interface with the bus 1040 via storage medium interface 1026.

Computer system 1000 may have any suitable physical form, including but not limited to one or more integrated circuits (ICs), printed circuit boards (PCBs), mobile handheld devices (such as mobile telephones or PDAs), desktop computers, tablet computers, laptop or notebook computers, distributed computer systems, computing grids, user equipment (e.g., a smart phone), a server, a server array or server farm, a web server, a network server, an Internet server, a main frame computer, a supercomputer, etc. Accordingly, functions and/or specific configurations of computer system 1000 described herein may be included or omitted based on use case. In some embodiments, computer system 1000 may be configured to be compatible with protocols and frequencies associated with one or more of the 3GPP LTE Specifications, IEEE 802.16 Standards, and IEEE 802.11 Standards for WLANs, and/or other broadband wireless networks cited herein although the embodiments are not limited in this respect. In some embodiments, computer system 1000 may utilize a single input single output (SISO) architecture for communications. However, certain implementations may include multiple antennas for transmission and/or reception using adaptive antenna techniques for beamforming or spatial division multiple access (SDMA) and/or using multiple input multiple output (MIMO) communication techniques.

Processor(s) 1001 (or central processing unit 1001) optionally contains a cache memory unit 1032 for temporary local storage of instructions, data, or computer addresses. Processor(s) 1001 are configured to assist in execution of computer-readable instructions stored on at least one non-transitory, tangible computer-readable storage medium. It should be noted that, if the processor 1001 includes more than one processing device, the processing devices may be centrally located (e.g., directly coupled together via a wired and/or wireless bus structure) or may be located in a distributed manner (e.g., cloud computing or indirect coupling via a local area network and/or a wide area network). Computer system 1000 may provide functionality as a result of the processor(s) 1001 executing software (e.g., software components, programs, applications, operating system software, middleware, firmware, routines and/or sub-routines, API, instruction sets, etc.) embodied in one or more non-transitory, tangible computer-readable storage media, such as memory 1003, storage 1008, storage devices 1035, and/or storage medium 1036 (e.g., read only memory (ROM)). In some embodiments, memory 1003 may read the software from one or more other non-transitory, tangible computer-readable storage media (such as mass storage device(s) 1035, 1036) or from one or more other sources through a suitable interface, such as network interface 1020. Any of the subsystems herein disclosed could include a network interface such as the network interface 1020. The software may cause processor(s) 1001 to carry out one or more processes or one or more steps of one or more processes described or illustrated herein. Carrying out such processes or steps may include defining data structures stored in memory 1003 and modifying the data structures as directed by the software. In some embodiments, an FPGA can store instructions for carrying out functionality as described in this disclosure. In other embodiments, firmware includes instructions for carrying out functionality as described in this disclosure. Further note that when the processor 1001 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 1001 executes, hard coded and/or operational instructions corresponding to at least some of the steps and/or functions illustrated in FIGS. 1-16.

The memory 1003 may include various components (e.g., non-transitory, tangible computer-readable storage media) including, but not limited to, a random-access memory component (e.g., RAM 1004, such as a static RAM "SRAM", a dynamic RAM "DRAM", a double-data-rate DRAM "DDRAM", a synchronous DRAM "SDRAM", etc.), a read-only component (e.g., ROM 1005), and any combinations thereof. ROM 1005 may act to communicate data and instructions unidirectionally to processor(s) 1001, and RAM 1004 may act to communicate data and instructions bidirectionally with processor(s) 1001. ROM 1005 and RAM 1004 may include any suitable non-transitory, tangible computer-readable storage media. In some instances, ROM 1005 and RAM 1004 include non-transitory, tangible computer-readable storage media for carrying out a method, such as a method for data migration and/or a method for data management using a cloud-based system. In one example, a basic input/output system 1006 (BIOS), including basic routines that help to transfer information between elements within computer system 1000, such as during start-up, may be stored in the memory 1003.

Fixed storage 1008 is connected bi-directionally to processor(s) 1001, optionally through storage control unit 1007. Fixed storage 1008 provides additional data storage capacity and may also include any suitable non-transitory, tangible computer-readable media described herein. Storage 1008 may be used to store operating system 10010, EXECs 1010 (executables), data 1011, API applications 1012 (application programs), and the like. Often, although not always, storage 1008 is a secondary storage medium (such as a hard disk) that is slower than primary storage (e.g., memory 1003). Storage 1008 can also include an optical disk drive, a solid-state memory device (e.g., flash-based systems), or a combination of any of the above. Information in storage 1008 may, in appropriate cases, be incorporated as virtual memory in memory 1003.

In one example, storage device(s) 1035 may be removably interfaced with computer system 1000 (e.g., via an external port connector (not shown)) via a storage device interface 1025. Particularly, storage device(s) 1035 and an associated machine-readable medium may provide nonvolatile and/or volatile storage of machine-readable instructions, data structures, program modules, and/or other data for the computer system 1000. In one example, software may reside, completely or partially, within a machine-readable medium on storage device(s) 1035. In another example, software may reside, completely or partially, within processor(s) 1001.

Bus 1040 connects a wide variety of subsystems. Herein, reference to a bus may encompass one or more digital signal lines serving a common function, where appropriate. Bus 1040 may be any of several types of bus structures including, but not limited to, a memory bus, a memory controller, a peripheral bus, a local bus, and any combinations thereof, using any of a variety of bus architectures. As an example, and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof. In some cases, the bus 1040 may utilize a wired and/or wireless bus structure.

Computer system 1000 may also include an input device 1033. In one example, a user of computer system 1000 may enter commands and/or other information into computer system 1000 via input device(s) 1033. Examples of an input device(s) 1033 include, but are not limited to, an alpha-numeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 1033 may be interfaced to bus 1040 via any of a variety of input interfaces 1023 (e.g., input interface 1023) including, but not limited to, serial, parallel, game port, USB, FIREWIRE, THUNDERBOLT, or any combination of the above In particular embodiments, when computer system 1000 is connected to network 1030, computer system 1000 may communicate with other devices, such as mobile devices and enterprise systems, connected to network 1030. Communications to and from computer system 1000 may be sent through network interface 1020. For example, network interface 1020 may receive incoming communications (such as requests or responses from other devices) in the form of one or more packets (such as Internet Protocol (IP) packets) from network 1030, and computer system 1000 may store the incoming communications in memory 1003 for processing. Computer system 1000 may similarly store outgoing communications (such as requests or responses to other devices) communicated to network 1030 from network interface 1020 in the form of one or more packets in memory 1003. Processor(s) 1001 may access these communication packets stored in memory 1003 for processing.

Examples of the network interface 1020 include, but are not limited to, a network interface card, a modem, and any combination thereof. Examples of a network 1030 or network segment 1030 include, but are not limited to, a wide area network (WAN) (e.g., the Internet, an enterprise network), a local area network (LAN) (e.g., a network associated with an office, a building, or other relatively small geographic space), a telephone network, a direct connection between two computing devices, and any combinations thereof. A network, such as network 1030, may employ a wired and/or a wireless mode of communication. In general, any network topology may be used. For example, in some cases, the network interface 1020 may comprise a radio frequency (RF) transceiver and one or more RF antennas.

Information and data can be displayed through a display 1032. Examples of a display 1032 include, but are not limited to, a liquid crystal display (LCD), an organic liquid crystal display (OLED), a cathode ray tube (CRT), a plasma display, and any combinations thereof. The display 1032 can interface to the processor(s) 1001, memory 1003, and fixed storage 1008, as well as other devices, such as input device (s) 1033, via the bus 1040. The display 1032 is linked to the bus 1040 via a video interface 1022, and transport of data between the display 1032 and the bus 1040 can be controlled via the graphics control 1021.

In addition to a display 1032, computer system 1000 may include one or more other peripheral output devices 1034 including, but not limited to, an audio speaker, a printer, etc. Such peripheral output devices may be connected to the bus 1040 via an output interface 1024. Examples of an output interface 1024 include, but are not limited to, a serial port, a parallel connection, a USB port (e.g., micro-USB, mini-USB, USB C, to name a few non-limiting examples), a FIREWIRE port, a THUNDERBOLT port, and any combinations thereof.

In addition, or as an alternative, computer system 1000 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an integrated circuit or IC) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, erasable programmable ROM (EPROM) memory, electrically erasable programmable (EEPROM) memory, registers, hard disk, a removable disk, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. The processor 1001 may be a single processor or a multi-core processor (e.g., a dual-core processor, a quad-core processor, a hexa-core processor, an octa-core processor, to name a few non-limiting examples) in different embodiments. In some other cases, the instructions may be passed to and executed by a GPU. The GPU may be configured to offload various computations or complement the processing provided by the processor 1001. In the alternative, the non-transitory, tangible computer-readable storage medium may be integral to the processor. The processor and the non-transitory, tangible computer-readable storage medium may reside in an ASIC. Furthermore, the ASIC may reside in a user terminal. In the alternative, the processor and the non-transitory, tangible computer-readable storage medium may reside as discrete components in a user terminal. In some embodiments, a software module may be implemented as digital logic components, such as those in an FPGA, once programmed with the software module.

It is contemplated that one or more of the components or subcomponents described in relation to the computer system 1000 shown in FIG. 10 such as, but not limited to, the network 1030, processor 1001, memory, 1003, etc., may comprise a cloud computing system. In one such system, front-end systems such as input devices 1033 may provide information to back-end platforms such as servers (e.g., computer systems 1000) and storage (e.g., memory 1003). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

While the methods and systems described herein have pertained to embodiments for appraisal documents, the inventions contemplated herein are not limited to any particular types of documents. For example, the systems and methods may be used to compare and reconcile documents in a wide-range of fields. For example, in some embodiments, for those involved in the pre-appraisal aspect of insurance claims, various aspects of documents (i.e. ADR provisions) may be compared and reconciled based upon custom rules, such as a policy deductible and other monetary considerations to allow for a customized release to be generated and reconciled. In other embodiments, the systems and methods may be employed by attorneys or mediators working to reach a decision on two disparate mediation or litigation perspectives.

As used in this specification and any claims of this application, the terms “computer”, “server”, “processor”, and “memory” all refer to electronic or other technological devices. These terms exclude people or groups of people. For the purposes of the specification, the terms display or displaying means displaying on an electronic device. As used in this specification and any claims of this application, the terms “computer readable medium,” “computer readable media," and "machine readable medium" are entirely restricted to tangible, physical objects that store information in a form that is readable by a computer. These terms exclude any wireless signals, wired download signals, and any other ephemeral signals.

While the disclosure has been described with reference to numerous specific details, one of ordinary skill in the art will recognize that the disclosure can be embodied in other specific forms without departing from the spirit of the disclosure. For instance, the specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the disclosure is not to be limited by the foregoing illustrative details, but rather is to be defined by the appended claims.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method of processing documents, the method comprising:

receiving, via a user interface on a front-end computing device, the documents in a plurality of formats;

sending the documents to a back-end computing system using one or more APIs, the back-end computing system executing one or more machine learning models in an asynchronous, distributed multi-threaded document analysis computing environment, the back-end computing system configured for non-blocking operation and running asynchronously using an asynchronous framework to execute tasks concurrently, the back-end computing system running asynchronously to:

process the documents using an input module configured to:

apply machine learning-based optical character recognition to convert the documents into machine-readable text, and perform layout and data analysis using pattern recognition algorithms and learned visual segmentation models to identify structural elements within the documents, extract, via a data extraction module, one or more predetermined data items from the documents using contextual natural language processing techniques including named entity recognition and contextual parsing to form extracted predetermined data items, serializing the extracted predetermined data items into structured JavaScript Object Notation (JSON) representations, wherein the JSON representations comprise key-value pairs;

normalize, via a data normalization module, the extracted predetermined data items into a unified format by:

applying schema mapping to align the extracted predetermined data items to a predefined structure; and resolving synonyms and terminological differences in the extracted predetermined data items using semantic embeddings and cosine similarity computation to form normalized data; and compare the documents, via a comparison module executing asynchronously on the structured JSON representations, wherein comparing comprises:

computing cosine similarity scores between semantic embeddings of description fields;

selecting a matched pair when the cosine similarity score exceeds a configurable similarity threshold;

excluding the matched pair from further comparison iterations to prevent duplicate matching by adding the matched pair to a tracking data structure; and identifying one or more unmatched items;

determine a comparison result of one or more matched items and one or more mismatched items from the documents, wherein the comparison result is output as a consolidated JSON data structure containing matched pairs with associated similarity scores and unmatched items with placeholder indicators; and providing a user interface on the front-end via the one or more APIs for one or more users to interact with the comparison result, manually adjust the one or more matched and one or more mismatched items, and submit feedback, wherein the submitted feedback is used to train the one or more machine learning models.

2. The method of claim 1, wherein extracting, via the data extraction module, comprises employing named entity recognition to identify one or more predetermined data items and interpret relationships between the one or more predetermined data items.

3. The method of claim 1, wherein the input module uses one or more machine learning algorithms to improve a detection of one or more document structures over time.

4. The method of claim 1, wherein the data normalization module applies one or more machine learning algorithms to dynamically update a synonym resolution database based on user feedback and new terminology.

5. The method of claim 1, wherein the comparison module computes a cosine similarity between two or more embeddings of terms to measure a semantic similarity between the terms, and determines a pair of terms with a highest cosine similarity as a matched pair; and wherein the match pair is excluded from further matching.

6. The method of claim 1, the comparison module computes a cosine similarity between two or more embeddings of terms to measure a semantic similarity between the terms, and wherein a matched pair is determined if the cosine similarity exceeds 85%.

7. The method of claim 1, wherein the comparison module uses reinforcement learning to optimize one or more fuzzy matching algorithms based on historical user inputs.

8. The method of claim 1, further comprising: updating one or more natural language processing models with supervised learning techniques using user provided corrections to the one or more mismatched items.

9. The method of claim 1, wherein extracting, via the data extraction module, comprises at least one of excluding text, visual diagrams, and handwritten notes.

10. The method of claim 1, wherein the comparison module uses a custom functionality to match one or more documents descriptions from a first insurance appraisal document with one or more documents descriptions from a second insurance appraisal document, and wherein one or more unmatched document descriptions are repeatedly compared.

11. The method of claim 1, wherein extracting one or more predetermined data items from the documents comprises extracting insurance appraisal specific data items.

12. The method of claim 11, wherein comparing, via the comparison module, comprises using fuzzy matching algorithms to perform at least one of: pairing one or more corresponding items, highlighting differences in one or more of appraised values, item conditions, and attributes, and flagging items present in a first insurance appraisal but missing in a second insurance appraisal.

13. A system for automating a comparison of documents, comprising:

- a front-end comprising a user interface, the user interface configured to provide interactive tools for a user to review, filter, and modify the one or more documents;
- a back-end communicating with the front-end via one or more application program interfaces (APIs), the back-end configured to execute one or more tasks asynchronously and concurrently using an asynchronous framework for non-blocking operation, one or more machine learning models, the back-end comprising:
  - an input module configured to receive one or more documents in varying formats and preprocess the one or more documents by, converting the one or more documents into a machine-readable text using machine learning-based optical character recognition, and analyzing the layouts using pattern recognition algorithms and learned visual segmentation models in the one or more documents;
- a data extraction module employing contextual natural language processing algorithms to extract one or more predetermined data items from the machine-readable text; and
- a data normalization module configured to:
  - serialize the extracted data into structured JSON objects, wherein the JSON objects comprise key-value pairs;
  - apply schema mapping to align the one or more predetermined data items to a predefined key-value structure; and
  - generate semantic embeddings for description fields and compute cosine similarity to resolve terminological inconsistencies;
- a comparison module configured to:
  - compute cosine similarity scores between embeddings of description fields;
  - determine matched pairs exceeding a configurable similarity threshold;
  - exclude matched pairs from subsequent comparison iterations to prevent duplication by adding matched pairs to a tracking data structure;
  - identify unmatched items; and
  - generate structured matched and unmatched output as a consolidated JSON data structure containing matched pairs with similarity scores and unmatched items with placeholder indicators; and
- a machine learning component configured to update one or more of the input module, data extraction module, data normalization module, and comparison module using user-provided feedback.

14. The system of claim 13, wherein the input module receives one or more appraisal documents and the one or more fuzzy matching algorithms are used to perform at least one of: pairing corresponding items, highlighting differences in appraised values, item conditions, and attributes, and flagging items present in a first appraisal but missing in a second appraisal.

15. The system of claim 13, wherein the data normalization module further comprises a synonym resolution database employing one or more natural language processing algorithms to map synonymous terms within the one or more documents into a unified terminology schema.

16. The system of claim 13, wherein the input module receives one or more appraisal documents the data normalization module is further configured to utilize a clustering algorithm to group similar appraisal items and automatically reconcile duplicated or inconsistent entries.

17. The system of claim 13, wherein the user interface is configured to provide interactive visualizations of one or more comparison results, including dynamic charts and tables that highlight statistically significant differences between the one or more predetermined data items.

18. The system of claim 13, wherein the comparison module is further configured to calculate and display confidence scores for each matched one or more predetermined data item, based on similarity metrics derived from the one or more fuzzy matching algorithms.

19. The system of claim 13, wherein a first API communicates the documents from the front-end to the back-end, extracts data and provides a structured JSON response to a second API that stores the data in a database.

20. A non-transitory computer-readable medium storing instructions that, when executed by a processor, cause the processor to perform a method for comparing documents, the method comprising:

- receiving, via a user interface on a front-end computing device, one or more documents in one or more formats;
- sending the documents to a back-end computing system configured for non-blocking operation using an asynchronous framework to execute tasks concurrently;
- processing the one or more documents using machine learning-based optical character recognition and layout analysis;
- extracting one or more data fields using natural language processing techniques including named entity recognition and contextual parsing;
- serializing the extracted data fields into structured JSON representations, wherein the JSON representations comprise key-value pairs;

normalizing, the one or more data fields into a predefined format using schema mapping and semantic embedding-based synonym resolution including cosine similarity computation to form a normalized data;

comparing the normalized data using cosine similarity scores between semantic embeddings;

selecting matched pairs exceeding a configurable similarity threshold;

excluding matched pairs from further comparison iterations by adding matched pairs to a tracking data structure;

identifying unmatched data fields;

performing the comparison asynchronously across serialized JSON representations;

outputting a consolidated JSON data structure containing matched pairs with similarity scores and unmatched items with placeholder indicators;

generating a visual report of the discrepancies; and adapting the method by training one or more machine learning models in response to using the user interaction as feedback to improve accuracy of the processing, extracting, normalizing, and comparing.

* * * * *